United States Patent
Subhojit et al.

(10) Patent No.: US 9,934,781 B2
(45) Date of Patent: Apr. 3, 2018

(54) METHOD OF PROVIDING VOICE COMMAND AND ELECTRONIC DEVICE SUPPORTING THE SAME

(71) Applicant: Samsung Electronics Co., Ltd., Gyeonggi-do (KR)

(72) Inventors: Chakladar Subhojit, Gyeonggi-do (KR); Sang Hoon Lee, Gyeonggi-do (KR); Ji Min Lee, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 14/755,441

(22) Filed: Jun. 30, 2015

(65) Prior Publication Data

US 2015/0379993 A1  Dec. 31, 2015

(30) Foreign Application Priority Data

Jun. 30, 2014  (KR) ........................ 10-2014-0080541

(51) Int. Cl.
| | | |
|---|---|---|
| *G10L 15/22* | (2006.01) | |
| *G10L 15/06* | (2013.01) | |
| *G10L 15/065* | (2013.01) | |
| *G10L 15/183* | (2013.01) | |
| *G10L 15/30* | (2013.01) | |

(52) U.S. Cl.
CPC ............. *G10L 15/22* (2013.01); *G10L 15/06* (2013.01); *G10L 15/065* (2013.01); *G10L 15/183* (2013.01); *G10L 15/30* (2013.01); *G10L 2015/223* (2013.01)

(58) Field of Classification Search
CPC ..... G10L 15/06; G10L 15/065; G10L 15/183; G10L 15/22; G10L 15/30; G10L 2015/223
See application file for complete search history.

(56) References Cited

U.S. PATENT DOCUMENTS

| | | |
|---|---|---|
| 7,324,947 B2 | 1/2008 | Jordan et al. |
| 8,005,679 B2 | 8/2011 | Jordan et al. |
| 8,407,056 B2 | 3/2013 | Jordan et al. |
| 2002/0116196 A1 | 8/2002 | Tran |
| 2003/0078784 A1 | 4/2003 | Jordan et al. |
| 2007/0233487 A1 | 10/2007 | Cohen et al. |

(Continued)

FOREIGN PATENT DOCUMENTS

| | | |
|---|---|---|
| KR | 10-2001-0088055 | 9/2001 |
| KR | 10-2010-0111164 | 10/2010 |
| WO | WO 2013/192218 | 12/2013 |

OTHER PUBLICATIONS

European Search Report dated Nov. 18, 2015 issued in counterpart application No. 15174352.3-1901, 7 pages.

*Primary Examiner* — Ibrahim Siddo
(74) *Attorney, Agent, or Firm* — The Farrell Law Firm, P.C.

(57) ABSTRACT

An electronic device, a method, and a chip set are provided. The electronic device includes a memory configured to store at least one of audio feature data of audio data and speech recognition data obtained by speech recognition of audio data; and a control module connected to the memory, wherein the control module is configured to update a voice command that is set to execute a function through voice, the function being selected based on at least one of the audio feature data, the speech recognition data, and function execution data executed in relation to the audio data.

16 Claims, 9 Drawing Sheets

(56) References Cited

U.S. PATENT DOCUMENTS

| | | | |
|---|---|---|---|
| 2008/0103779 A1* | 5/2008 | Huang | G10L 15/28 704/275 |
| 2008/0120112 A1 | 5/2008 | Jordan et al. | |
| 2011/0213613 A1 | 9/2011 | Cohen et al. | |
| 2011/0270615 A1 | 11/2011 | Jordan et al. | |
| 2012/0035935 A1* | 2/2012 | Park | G10L 15/22 704/275 |
| 2013/0006640 A1 | 1/2013 | Cohen et al. | |
| 2013/0179166 A1* | 7/2013 | Fujibayashi | G10L 15/22 704/235 |
| 2013/0197914 A1 | 8/2013 | Yelvington et al. | |
| 2013/0211836 A1 | 8/2013 | Jordan et al. | |
| 2013/0246065 A1 | 9/2013 | Cohen et al. | |
| 2013/0325484 A1 | 12/2013 | Chaidadar et al. | |
| 2013/0346077 A1 | 12/2013 | Mengibar et al. | |
| 2014/0019130 A1 | 1/2014 | Jordan et al. | |
| 2014/0136200 A1* | 5/2014 | Winter | G10L 15/07 704/244 |
| 2014/0278435 A1* | 9/2014 | Ganong, III | G10L 15/22 704/275 |
| 2015/0254334 A1 | 9/2015 | Mengibar et al. | |

* cited by examiner

METHOD OF PROVIDING VOICE COMMAND AND ELECTRONIC DEVICE SUPPORTING THE SAME

PRIORITY

This application claims priority under 35 U.S.C. § 119(a) to a Korean Patent Application filed on Jun. 30, 2014 in the Korean Intellectual Property Office and assigned Serial number 10-2014-0080541, the entire contents of which are incorporated herein by reference.

BACKGROUND

1. Field of the Disclosure

The present disclosure relates to a method and electronic device for providing a voice command, and more particularly to a method and electronic device for converting audio data into a voice command to instantly process a function without a delay due to server management when the audio data satisfies a specific condition.

2. Description of the Related Art

With the recent development of digital technology, various mobile electronic devices (for example, mobile communication devices, Personal Digital Assistants (PDAs), smartphones, tablet Personal Computers (PCs), and so on) capable of processing communication and personal information are available. Such electronic devices are equipped with a speech recognition function. Accordingly, when a user inputs voice, the related art electronic device may recognize the voice and output a recognition result.

Moreover, an electronic device performs server device management in order to improve the reliability of a speech recognition result. Accordingly, in relation to using a speech recognition function, an electronic device performs an operation for transmitting voice data to a server device and receiving information corresponding thereto. During this operation, the electronic device may experience significant delay. The delay may cause inconvenience during repeated operation of a speech recognition function.

SUMMARY

The present disclosure has been made to address the above-mentioned problems and disadvantages, and to provide at least the advantages described below.

Accordingly, an aspect of the present disclosure provides a voice command providing method for converting audio data into a voice command to instantly process a function without a delay due to server management when the audio data satisfies a condition and an electronic device supporting the same.

In accordance with an aspect of the present disclosure, an electronic device is provided. The electronic device includes a memory configured to store at least one of audio feature data of audio data and speech recognition data obtained by speech recognition of audio data; and a control module connected to the memory, wherein the control module is configured to update a voice command that is set to execute a function through voice, the function being selected based on at least one of the audio feature data, the speech recognition data, and function execution data executed in relation to the audio data.

In accordance with another aspect of the present disclosure, a voice command providing method is provided. The voice command providing method includes collecting audio data; and updating a voice command that is set to execute a function through voice, the function being specified based on at least one of audio feature data of the collected audio data and speech recognition data obtained by speech recognition of the audio data and function execution data executed in relation to the audio data.

In accordance with another aspect of the present disclosure, a chipset is provided. The chipset is configured to collect audio data; and update a voice command that is set to execute a function through voice, the function being specified based on at least one of audio feature data of the collected audio data and speech recognition data obtained by speech recognition of the audio data and function execution data executed in relation to the audio data.

An electronic device collects audio data. A voice command providing system transmits the audio data to a server device through a network. The server device analyzes the audio data and provides analysis data of the audio data to the electronic device. The electronic device registers audio data as a voice command on the basis of the received audio analysis data. If audio data relating to a voice command is collected, the electronic device performs a function for the voice command separately from the server device. The voice command providing system supports a prompt function call by registering audio data as an instruction in relation to a function execution of the electronic device. Additionally, the voice command providing system may establish a voice command architecture by converting a recent frequently used function as a voice command according to a history of audio data that a user of the electronic device inputs and managing the voice command. Additionally, the voice command providing system may efficiently manage the voice command architecture (or system) by removing an unused voice command.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
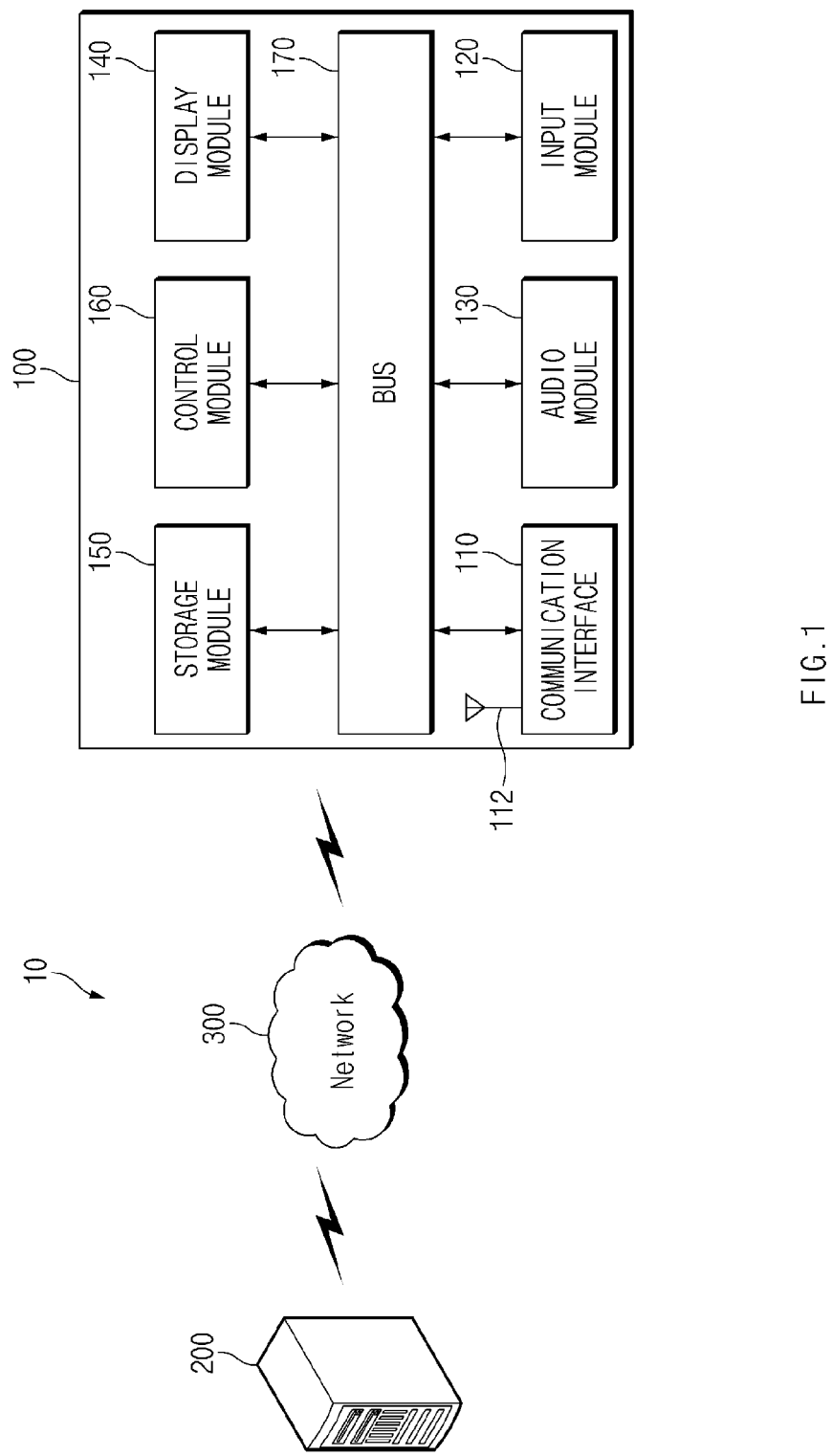
FIG. 1 is a block diagram of a voice command providing system according to an embodiment of the present disclosure.

Hereinafter, an electronic device according to various embodiments of the present disclosure is described in more detail with reference to the accompanying drawings. Various modifications are possible in various embodiments of the present disclosure and specific embodiments are illustrated in the accompanying drawings and related detailed descriptions are provided. However, this does not limit the various embodiments of the present disclosure to a specific embodiment and it should be understood that the present disclosure covers all modifications, equivalents, and/or replacements of this disclosure provided they are within the scope of the appended claims and their equivalents. With respect to the descriptions of the accompanying drawings, like reference numerals refer to like elements.

FIG. 1 is a block diagram of a voice command providing system according to an embodiment of the present disclosure.

Referring to FIG. 1, a voice command providing system 10 includes an electronic device 100, a network 300, and a server device 200.

The voice command providing system 10 of such a configuration transmits audio data, collected by the electronic device 100, to the server device 200 through the network 300. The server device 200 transmits analysis data of audio data to the electronic device 100. The electronic device 100 registers specific audio data as a voice command on the basis of the received audio analysis data (for example, audio feature data, speech recognition data, function execution data (or function performance data), and so on). If audio data relating to a voice command is collected, the electronic device 100 performs a function (e.g. voice short-cut) for the voice command separately from the server device 200. The above-mentioned voice command providing system 10 supports a prompt function call (for example, search, execution, activation, or deactivation) by registering specific audio data as an instruction in relation to a specific function execution of the electronic device 100. Additionally, the voice command providing system 10 may establish a voice command architecture (or system) substantially by converting a recent frequently used function as a voice command according to a history of audio data that a user of the electronic device 100 inputs and managing the voice command. Additionally, the voice command providing system 10 may efficiently manage the voice command architecture (or system) by removing an unused voice command.

The network 300 supports a communication channel establishment between the electronic device 100 and the server device 200. The network 300 may be prepared with a network device element capable of supporting a communication method of at least one communication module prepared in the electronic device 100. For example, the network 300 may include a cellular communication related network device element (for example, a mobile base station, a mobile switching center, etc.), a Wireless Fidelity (WiFi) communication related network device element (for example, an Access Point (AP), a core network, etc.), and the like. The network 300 is not limited to a specific device element. The network 300 may be prepared with at least one device element that establishes at least one communication channel available for transmission of audio data and transmission of audio analysis data between the electronic device 100 and the server device 200. According to an embodiment of the present disclosure, if a communication channel is established through a short-range wireless communication method or a direct communication method (e.g. a method of directly establishing a communication channel without passing through a base station), the network 300 may be omitted. An example of transmitting/receiving data on the basis of a form of including the network 300 is described below.

The server device 200 establishes a communication channel with the electronic device 100 through the network 300. According to an embodiment of the present disclosure, the server device 200 establishes a data communication channel with the electronic device 100 in relation to the reception of audio data and the transmission of audio analysis data. According to an embodiment of the present disclosure, the server device 200 establishes a voice communication channel for receiving audio data from the electronic device 100 and a data communication channel for transmitting audio analysis data to the electronic device 100. According to an embodiment of the present disclosure, the server device 200 manages and provides a voice command of the electronic device 100. For example, the server device 200 may store information on voice commands for each of at least one electronic device 100 or each of at least one user. The server device 200 analyzes audio data that the electronic device 100 provides. The server device 200 may perform the deletion of voice commands performed on the electronic device 100 or the addition of a new voice command on the basis of audio analysis data. When a voice command update occurs, the server device 200 provides voice command update information to the electronic device 100.

The electronic device 100 establishes a connection with the server device 100 through the network 300 and transmits audio data to the server device 200. The electronic device 100 receives audio analysis data from the server device 200. The electronic device 100 may generate new voice commands or remove a pre-generated voice command on the basis of the received audio analysis data. According to an embodiment of the present disclosure, the electronic device 100 may update a pre-generated voice command on the basis of the collected audio data. According to an embodiment of the present disclosure, the electronic device 100 may generate a specific voice command by an input event. According to an embodiment of the present disclosure, the electronic device 100 may receive a specific voice command from another electronic device or the server device 200 and store the received specific voice command. The electronic device 100 may update a stored voice command by using the collected audio data or the audio analysis data that the server device 200 provides. According to an embodiment of the present disclosure, the electronic device 100 may not update by at least one of the collected audio data and the audio analysis data in relation to a specific voice command. According to an embodiment of the present disclosure, the electronic device 100 manages a candidate recognition model relating to voice command generation in a voice command update operation. The voice command may be included in a recognition model (for example, a model including at least one of audio feature data and speech recognition data) and managed.

The above-mentioned electronic device 100 may include a communication interface 110, an antenna 112, an input module 120, an audio module 130, a display module 140, a storage module 150, a control module 160, and a bus 170.

The communication interface 110 establishes a communication channel with the network 300. According to an embodiment of the present disclosure, the communication interface 110 establishes a communication channel with the network 300 according to a communication method such as 3G/4G, and so on. According to an embodiment of the present disclosure, the communication interface 110 establishes a communication channel according to a WiFi communication method via the antenna 112. The communication interface 110 may establish a communication channel with the server device 200 through the network 300. In relation to this, the electronic device 100 may perform the connection of the server device 200 by using pre-stored or inputted address information. Herein, the address information, as information such as an Internet Protocol (IP) address and so on, may include identification information of the server device 200 registered in the network 300.

According to an embodiment of the present disclosure, when performing a specific function (for example, a voice search function such as S-Voice of the Samsung Galaxy, a voice search function such as Siri of the Apple iPhone, etc.) of the electronic device 100, the communication interface 110 may be activated automatically. Alternatively, when audio data is collected according to a specific function execution, the communication interface 110 may be activated. The communication interface 110 may transmit the collected audio data to the server device 200. During this operation, the communication interface 110 may transmit identification information (for example, address information of the electronic device 100, phone number information of the electronic device, hardware related information of the electronic device 100 such as Media Access Control (MAC) address, etc.) of the electronic device 100.

According to an embodiment of the present disclosure, the communication interface 110 receives audio analysis data (for example, at least one of audio feature data, speech recognition data, and function execution data relating to transmitted audio data) from the server device 200. The communication interface 110 delivers the received audio analysis data to at least one of the storage module 150 and the control module 160. According to an embodiment of the present disclosure, the communication interface 110 receives at least one of a voice command and voice command update information from the server device 200. The voice command and voice command update information that the communication interface 110 receives may be stored in the storage module 150 and the control module 160 or updated.

The input module 120 generates an input signal relating to the management of the electronic device 100. For example, the input module 120 may include a physical key button (for example, a home key, a side key, a power key, etc.), a jog key, a keypad, and the like. The input module 120 may include a virtual keypad outputted to the display module 140 as an input device. The input module 120 may generate an input signal relating to the execution of a specific application (app) (for example, a voice search function, a voice command management function, etc.). According to an embodiment of the present disclosure, the input module 120 generates an input signal relating to a character input corresponding to a specific voice command. The input module 120 may generate an input signal for requesting the connection from the server device 200, an input signal relating to a specific voice command reception from the server device 200, and so on. The voice command may correspond to a recognition model (for example, a model including at least one of audio data, audio feature data, and speech recognition data).

The audio module 130 supports a function relating to the audio data output and audio data collection of the electronic device 100. In relation to this, the audio module 130 includes a speaker for performing an audio data output and at least one microphone for supporting audio data collection. If a specific app (for example, a voice search function) of the electronic device 100 is executed, the audio module 130 may be activated automatically. According to an embodiment of the present disclosure, if power is supplied to the electronic device 100, the audio module 130 is activated to perform audio data collection in real time or at predetermined periods (for example, an "always on" mode, which is a mode or function in which a voice search or collection function is performed as background processing). The audio data that the audio module 130 collects may be stored in the storage module 150 or may be transmitted to the server device 200 through the communication interface 110 according to a control of the control module 160.

According to an embodiment of the present disclosure, when collecting specific audio data, the audio module 130 outputs response information on the collected audio data. For example, as a speech recognition result for the collected audio data, the audio module 130 outputs information that describes the type of a function performed based on the speech recognized result and information relating to the generation of a voice command corresponding to the collected audio data or the removal of a specific voice command. The audio data that the audio module 130 collects, as mentioned above, is transmitted to the server device 200 and is speech-recognized by the electronic device 100. For example, when the electronic device 100 is unable to connect to the server device 200, it performs speech recognition on the collected audio data.

According to an embodiment of the present disclosure, the audio module 130 outputs information relating to voice command processing, information relating to a function execution according to voice command processing, and information relating to voice command update (for example, a generation of a new voice command or a change or deletion of an existing voice command). The above-mentioned information output of the audio module 130 may be omitted according to a user setting.

The display module 140 provides at least one screen interface (or a user interface) relating to the management of the electronic device 100. For example, the display module 140 may output a lock screen, a turn-off screen in a sleep mode state, a standby screen, a menu screen, etc. According to an embodiment of the present disclosure, the display module 140 outputs a screen according to a specific function execution (for example, a voice search function). The display module 140 outputs a screen relating to a voice search function when the voice search function is executed. When a microphone collects specific audio data, the display module 140 may output a screen relating to the transmission to the server device 200 of the collected audio data, a screen relating to audio analysis data reception from the server device 200, and a screen relating to the update of a voice command by the received audio analysis data. When audio data corresponding to a specific voice command is collected, the display module 140 outputs a function execution screen corresponding to a corresponding voice command.

According to an embodiment of the present disclosure, the display module 140 outputs a virtual keypad screen relating to a character input corresponding to a voice command. The display module 140 may output a list screen relating to stored voice commands and a screen relating to voice command editing. The list screen relating to voice commands may include at least one voice command and information on function items to be performed when each voice command is inputted. The display module 140 may output an information screen for candidate recognition models relating to voice commands. Information on candidate recognition models may include audio feature data (for example, data such as audio frequency characteristics or time domain characteristics), speech recognition data (for example, data such as characters obtained through speech recognition), function execution data (for example, a specific function item executed according to audio data), and information on a weight (for example, the number of times that the same audio data is collected).

The storage module 150 stores information relating to the management of the electronic device 100, for example, an operating system, app data according to a specific function execution, and the like. The storage module 150 may store data relating to a voice command providing function. For example, the storage module 150 may store audio data that the microphone of the audio module 130 collects. The storage module 150 may store audio analysis data that the server device 200 provides in correspondence to the transmitted audio data. In relation to this, the storage module 150 may store a voice command generation table. The storage module 150 may store an app relating to a voice search function. The storage module 150 may store various apps to be executed by a voice command. The voice command generation table stored in the storage module 150 may be updated by collected audio data, received audio analysis data, and update information that the server device 200 provides.

The bus 170 may support a signal flow between each of components of the electronic device 100. For example, the bus 170 may deliver audio data that the audio module 130 collects to the control module 160 or may deliver the audio data to the communication interface 110 according to a control of the control module 160. Additionally, the bus 170 may deliver audio analysis data, received through the communication interface 110, to at least one of the storage module 150 and the control module 160.

The control module 160 may perform the transmission and processing of data relating to the management of the electronic device 100. The control module 160 may perform the transmission and processing of a control signal relating to the management control of the electronic device 100. In relation to a voice command providing function support, the control module 160 may be implemented as shown in FIG. 2.

Figure 2:
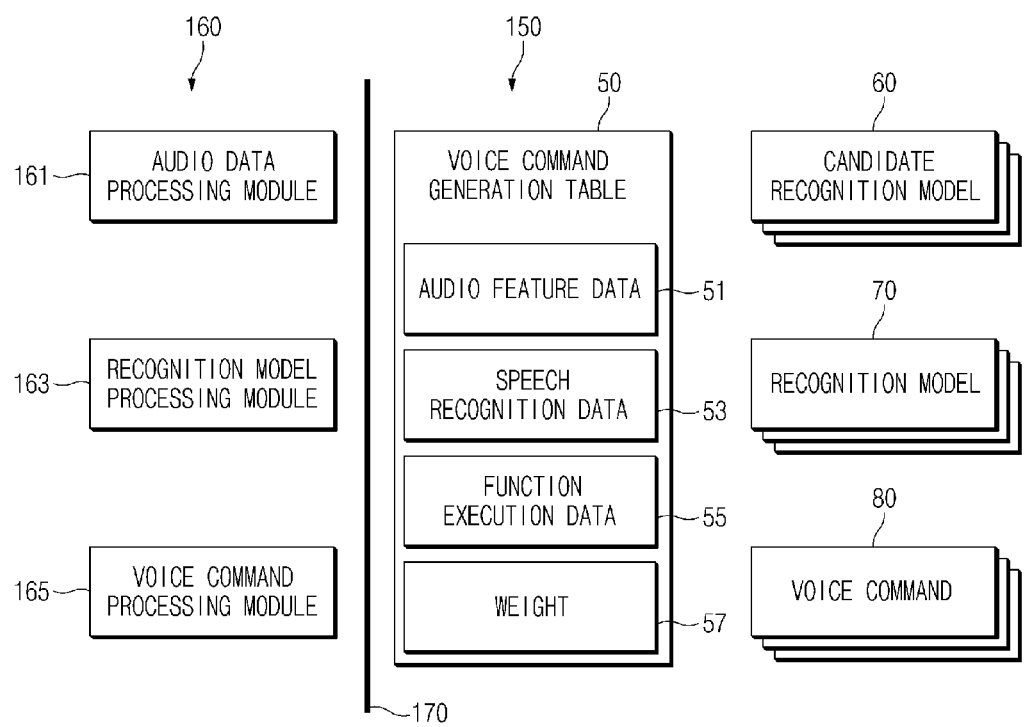
FIG. 2 is a block diagram of a control module and a storage module according to an embodiment of the present disclosure.

FIG. 2 is a block diagram of the control module 160 and the storage module 150 according to an embodiment of the present disclosure.

Referring to FIG. 2, the storage module 150 of the electronic device 100 according to an embodiment of the present disclosure includes a voice command generation table 50, a candidate recognition model 60, a recognition model 70, and a voice command 80.

The voice command generation table 50 includes audio feature data 51, speech recognition data 53, function execution data 55, and a weight 57. The audio feature data 51, the speech recognition data 53, and the function execution data 55 included in the voice command generation table 50 may be collected based on audio analysis data that the server device 200 provides. According to an embodiment of the present disclosure, the audio feature data 51 and the speech recognition data 53 may be provided by an analysis of the electronic device 100. In relation to this, the electronic device 100 may further include a speech recognition algorithm (for example, an algorithm for performing speech recognition on audio data to output the audio data as text) and an audio feature analysis module (for example, a module for extracting the acoustic feature of audio data, for example, spectrum information of audio data). Additionally, the control module 160 of the electronic device 100 may perform a control to generate and store function execution data 55 by mapping a speech recognition result into a function executed on the electronic device 100.

The audio feature data 51 may be data on an audio feature (including a frequency or time axis area feature value such as Mel Frequency Cepstral Coefficients (MFCC), Linear Prediction Coefficients (LPC), Line Spectral Pairs (LSP), autocorrelation, power spectrum, pitch, etc.) for specific audio data (for example, audio data that a user speaks). The audio feature data 51 may include at least one audio feature (or a sound wave frequency feature) included in each of at least one word, word-phrase, clause, phrase, sentence, paragraph, and page. The audio feature data 51 may be data into which an audio feature is mapped for each audio data. The audio feature data 51 on each audio feature may be received from the server device 200 and stored. Alternatively, the audio feature data 51 may be detected by the electronic device 100 and stored.

The speech recognition data 53 may be speech recognized text information. The control module 160 of the electronic device 100 transmits specific audio data, collected when a user speaks, to the server device 200 through the communication interface 110. The control module 160 receives a speech recognition result (for example, text) corresponding to specific audio data and stores it in the storage module 150. The speech recognition data 53 may include a text mapped into specific audio data.

The function execution data 55 includes function execution information of the electronic device 100 mapped into specific audio data. According to an embodiment of the present disclosure, the function execution data 55 includes specific function execution information of the electronic device 100, which is obtained by analyzing audio data that the server device 200 receives from the electronic device 100. According to an embodiment of the present disclosure, the function execution data 55 is data that the electronic device 100 maps concerning specific function execution information executed by the collected audio data.

The weight 57 is defined based on information on the number of times that audio data relating to each of the audio feature data 51, the speech recognition data 53, and the function execution data 55 are collected and a collection time, the frequency of use of a specific app executed by audio data, and a usage time of a specific app. According to an embodiment of the present disclosure, the weight 57 may have a relatively large value corresponding to the number of times that each audio data is collected. According to an embodiment of the present disclosure, the weight 57 may have a relatively larger value for a recent time at which audio data is collected. According to an embodiment of the present disclosure, the weight 57 may have a relatively large value corresponding to the number of times that audio data is collected within a set predetermined period. The weight 57 may be used for generating the candidate recognition module 60 or the recognition model 70 and generating the voice command 80 according thereto.

For example, the collected audio data may be the following information spoken in English: "Hello, how are you doing?" (first collected audio data 1), "Show me the nearest restaurants." (second collected audio data 2), "Is it going to rain tomorrow?" (third collected audio data 3), "How do I get to the nearest subway station?" (fourth collected audio data 4), "Show me the nearest restaurants." (fifth collected audio data 5), "What is the stock price of Samsung Electronics?" (sixth collected audio data 6), "Is it going to rain tomorrow?" (seventh collected audio data 7), "Set an alarm for 6 am on Monday." (eighth collected audio data 8), "I feel like having an ice-cream." (ninth collected audio data 9), and "Show me the nearest restaurants." (tenth collected audio data 10). The control module 160 may configure a voice command table as shown in Table 1 below with respect to the audio data. Table 1 illustrates a table of the audio feature data 51, the speech recognition data 53, the function execution data 55, and the weight 57 for collected audio data.

TABLE 1

| Weight | Audio feature data | Speech recognition data | Function execution data |
|---|---|---|---|
| 3 | 2, 5, 10 | Show me the nearest restaurants. | Open Map (Local search) |
| 2 | 3, 7 | Is it going to rain tomorrow? | Weather for current location |
| 1 | 1 | Hello, how are you doing? | Chatbot response |
| 1 | 4 | How do I get to the nearest subway station? | Open Map (Navigation) |
| 1 | 6 | What is the stock price of Samsung Electronics? | QnA |
| 1 | 8 | Set an alarm for 6 am on Monday. | Alarm |
| 1 | 9 | I feel like having an ice-cream. | Open Map (Local search) |

The candidate recognition model 60 may be candidate models prepared before the generation of the recognition model 70. When specific audio data satisfies a specific predetermined specific condition (for example, at least one of the predetermined number of collections, collection within a specific predetermined specific time, the frequency of use of a specific app executed by audio data, and a usage time of a specific app), the candidate recognition model 60, for example, may be generated based on the audio feature data 51, the speech recognition data 53, and the function execution data 55 corresponding to corresponding audio data. When the specific audio data does not satisfy a specific predetermined specific condition (for example, at least one of when there is no audio data collection during a specific predetermined specific period and when the frequency of use of a specific app executed by audio data or a usage time is less than a predetermined value), the candidate recognition model 60 relating to the specific audio data may be removed. According to an embodiment of the present disclosure, the processing operation for the candidate module 60 in a voice command providing function of the electronic device 100 may be omitted. In this case, the candidate recognition module 60 may not be stored in the storage module 150.

The recognition module 70 is comparison information corresponding to the voice command 80. The recognition module 70 may include information mapped into each voice command 80. According to an embodiment of the present disclosure, the recognition model 70 may include at least one of the audio feature data 51 and the speech recognition data 53 corresponding to the specific voice command 80. According to an embodiment of the present disclosure, when audio data satisfying a predetermined specific condition is collected, the recognition model 70 is generated based on the voice command generation table 50 corresponding to the corresponding audio data. According to an embodiment of the present disclosure, if the recognition model 70 does not satisfy a predetermined specific condition, it is removed. During the management of the candidate recognition model 60, some of the candidate recognition models 60 that satisfy a specific predetermined specific condition among the candidate recognition models 60 may be converted into the recognition model 70.

The voice command 80 may be mapped into each recognition model 70 and stored. The voice command 80 may be mapped into the function execution data 55. When a new recognition model 70 is generated, the new voice command 80 may be added. When the recognition model 70 is removed, the voice command 80 may be removed. At least one voice command 80 among the voice commands 80 may not be removed and may be maintained according to a setting regardless of an additional defined condition. The voice command 80 may be a command used for a voice shortcut function. For example, if audio data corresponding to the voice command 80 is collected, the control module 160 may perform a control to execute a function mapped into the voice command 80.

The control module 160 includes an audio data processing module 161, a recognition model processing module 163, and a voice command processing module 165.

The audio data processing module 161 controls the collection and processing of audio data. For example, the audio data processing module 161 may perform a control to activate a microphone when a voice search function is activated. The audio data processing module 161 may perform a control to transmit audio data that a microphone collects to the server device 200. The audio data processing module 161 may control an audio analysis data reception corresponding to audio data that the server device 200 provides. The audio data processing module 161 may extract the audio feature data 51, the speech recognition data 53, and the function execution data 55 from the received audio analysis data. The audio data processing module 161 may update each data stored in the storage module 150 on the basis of the extracted data.

According to an embodiment of the present disclosure, the audio data processing module 161 maps the audio feature data 51 in relation to the collected audio data. For example, when receiving the audio feature data 51 for audio data such as "camera," "weather," "news," "stock information," "please call mom," and so on from the server device 200, the audio data processing module 161 maps the received audio feature data 51 into each audio data and stores them.

According to an embodiment of the present disclosure, the audio data processing module 161 maps the audio feature data 51 for one word of audio data such as "camera" and stores it. According to an embodiment of the present disclosure, the audio data processing module 161 maps audio feature data for each word of a three-word phrase such as "please call mother" into a corresponding character and stores them as one audio feature data 51. The audio feature data 51 may have a predetermined error range by a situation or environment in which a user speaks or a user's physical change. For example, an audio feature for "please call mother" may have a predetermined difference value according to a speaking place (for example, an open area, a confined place, a place having noise of more than a predetermined value, a place with a different barometric pressure, and the like). The audio data processing module 161 may map audio features within a predetermined error range into audio features for one audio data and may store a mapping result as the audio feature data 51. According to an embodiment of the present disclosure, even if audio data is configured with a similar sentence, the server device 200 or the electronic device 100 may classify a sentence including another word as different audio features. For example, the audio data processing module 161 may classify audio data corresponding to "please call mother" and audio data corresponding to "please call sister" as different audio feature data and store them.

According to an embodiment of the present disclosure, the audio data processing module 161 extracts speech recognition data and audio feature data for the received audio data by using a pre-stored speech recognition algorithm and an audio feature extraction module according to a specific situation (for example, a voice search function is performed in a situation where the electronic device 100 is unable to establish a communication channel with the server device 200) or predetermined schedule information. In relation to this, the audio data processing module 161 may include a speech recognizer or speech recognition processor relating to audio data speech recognition. For example, the audio data processing module 161 may include a speech recognizer (for example, a voice command extractor) for determining whether audio data relates to a voice shortcut function (for example, S-Voice, Siri, etc.) or what function is to be executed in a voice shortcut function execution state. The audio data processing module 161 may update the speech recognition data 53 and the audio feature data 51 stored in the storage module 150 by using the extracted data. The audio data processing module 161 may check a function execution state after speech recognition and may update the function execution data 55 on the basis of the checked function execution information.

The recognition model processing module 163 manages at least one of the candidate recognition model 60 and the recognition model 70. According to an embodiment of the present disclosure, the recognition model processing module 163 performs a control to generate a new candidate recognition model 60 on the basis of the weight 57 of analysis data of audio data that the electronic device 100 collects. The recognition model processing module 163 may change the candidate recognition model 60 into the recognition model 70 according to a specific condition after changing a score of the candidate recognition model 60 in relation to the collected audio data. The recognition model processing module 163 may generate a new recognition model 70 by changing the candidate recognition model 60 into the recognition model 70 in correspondence to a specific condition. When a new recognition model 70 is generated, the recognition model processing module 163 may generate a voice command 80 corresponding to the recognition model 70. Alternatively, a voice command 80 may be generated automatically based on analysis data of audio data contributed to the generation of the recognition model 70. According to an embodiment of the present disclosure, the recognition model processing module 163 may remove the candidate recognition model 60 according to a specific condition. Additionally, when removing the specific recognition model 70, the recognition model processing module 163 may remove a voice command 80 corresponding thereto.

According to an embodiment of the present disclosure, when the electronic device 100 manages a large vocabulary recognition processor (or device), speech recognition performance is possible based on a voice command list. Correspondingly, the recognition model processing module 163 may be integrated into the voice command processing module 165 so that they may be configured as one module. Similarly, the electronic device 100 may support voice command processing on the basis of at least one of a voice command 80 and a recognition model 70. For example, the electronic device 100 may map audio data and a voice command 80 without recognition model management and may support voice command processing on the basis of the mapping result. Alternatively, the electronic device 100 may support recognition model based function processing by mapping audio data into a recognition model 70 and mapping the mapped recognition model 70 into a specific function.

The voice command processing module 165 determines whether audio data that the electronic device 100 collects corresponds to a voice command 80. If the collected audio data corresponds to a voice command 80, the voice command processing module 165 performs a control to execute a specific function mapped into the voice command 80. During this operation, the voice command processing module 165 may determine a similarity by mutually comparing the recognition model 70 and the collected audio data. The voice command processing module 165 may detect the recognition model 70 of which similarity to the collected audio data is more than a predetermined value and may check a function item of the voice command 80 mapped into the recognition model 70.

As mentioned above, the electronic device 100 according to an embodiment of the present disclosure may collect audio analysis data of audio data obtained in real time, at a predetermined period, or during specific app execution. The electronic device 100 may generate a new voice command 80 or update a voice command 80 on the basis of the audio analysis data. The electronic device 100 may support the generation and management of a voice command 80 corresponding to an app that a user uses frequently or heavily or a heavily used function.

Figure 3:
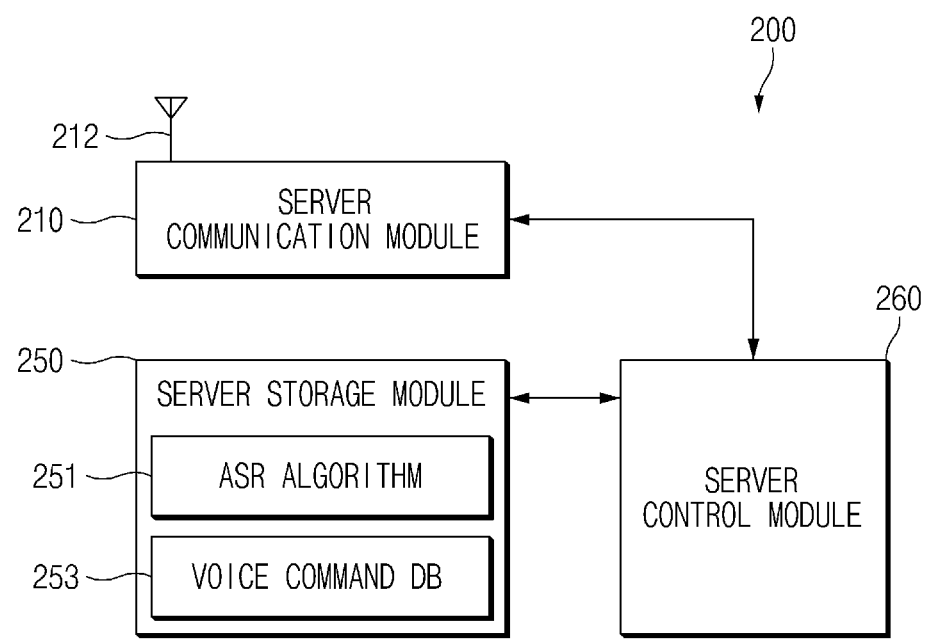
FIG. 3 is a block diagram of a server device according to an embodiment of the present disclosure.

FIG. 3 is a block diagram of a server device 200 according to an embodiment of the present disclosure.

Referring to FIG. 3, a server device 200 according to an embodiment of the present disclosure includes a server communication module 210, an antenna 212, a server storage module 250, and a server control module 260.

The server communication module 210 may establish a communication channel with the network 300 and may establish a communication channel in correspondence to the connection of the electronic device 100. The server communication module 210 may receive, from the electronic device 100, audio data corresponding to audio data that a user speaks. The collected audio data may be delivered to at least one of the server storage module 250 and the server control module 260. The server communication module 210 may transmit audio analysis data to the electronic device 100 according to a control of the server control module 260. According to an embodiment of the present disclosure, the server communication module 210 may transmit, to the electronic device 100, a voice command 80 and voice command update information relating to the specific electronic device 100.

The server storage module 250 stores a program and data relating to a voice command providing function. For example, the server storage module 250 may store an Automatic Speech Recognition (ASR) algorithm 251 and a voice command database 253. The ASR 251 may include an algorithm supporting speech recognition for audio data that the electronic device 100 transmits. The voice command database 253 may include information on voice commands 80 for each electronic device. According to an embodiment of the present disclosure, the server storage module 250 may store an audio data analysis program. The audio data analysis program may include, for example, an audio data collection routine (for example, programmable information designed to execute a specific function, as including an instruction or an instruction set, a function, syntax, a template, class, etc.), a data processing routine, and a processing data transmission routine.

Figure 4:
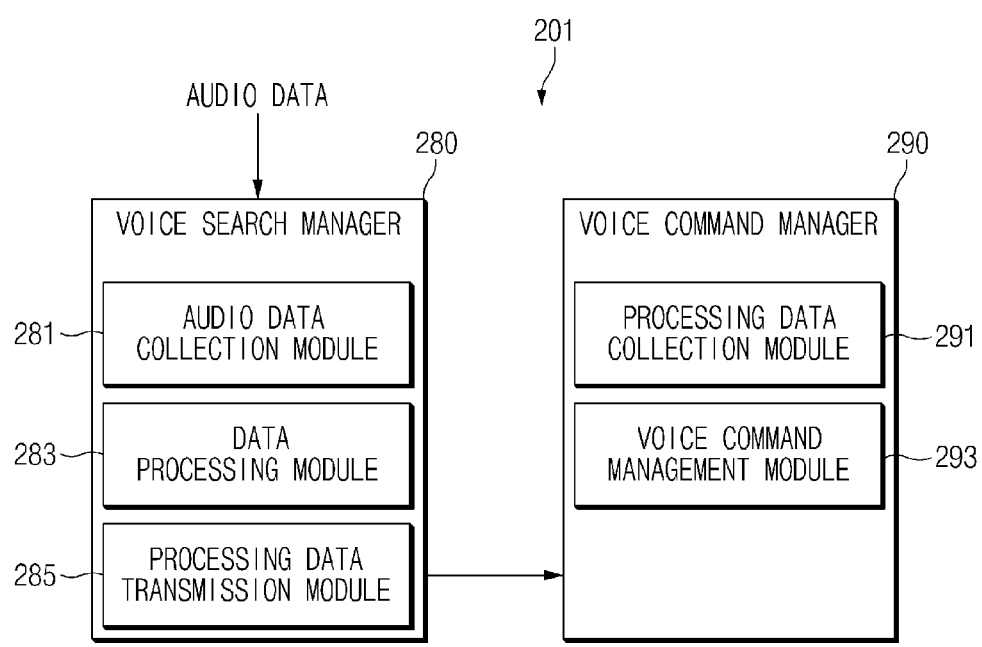
FIG. 4 is a block diagram relating to voice command processing according to an embodiment of the present disclosure.

The server control module 260 controls the performance of at least one of the connection of the electronic device 100, the analysis of audio data and analysis data provision, and voice command management. The server control module 260 may include a voice command related block 201 as shown in FIG. 4. According to various embodiments of the present disclosure, the voice command related block 201 may be established in the electronic device 100 and managed.

FIG. 4 is a block diagram relating to voice command processing according to an embodiment of the present disclosure.

Referring to FIG. 4, the voice command related block 201 includes a voice search manager 280 and a voice command manager 290. At least one block in the voice command related block 201 may be included in a configuration of the server control module 260.

The voice search manager 280 includes an audio data collection module 281, a data processing module 283, and a processing data transmission module 285.

The audio data collection module 281 performs a control so that the server communication module 210 establishes a communication channel with the electronic device 100. For example, when the server communication module 210 receives a connection request of the electronic device 100, the audio data collection module 281 controls communication connection processing in correspondence thereto. The audio data collection module 281 collects audio data that the electronic device 100 provides in addition to the identification information of the electronic device 100. The audio data collection module 281 delivers audio data to the data processing module 283.

The data processing module 283 performs analysis on the audio data that the audio data collection module 281 delivers. The data processing module 283 extracts audio feature data, speech recognition data, and function execution data from the collected audio data. In relation to this, the data processing module 283 may include an analysis module for analyzing the frequency spectrum of audio data. The data processing module 283 may manage the ASR algorithm 251 stored in the storage module 150 in relation to the speech recognition data extraction. The data processing module 283 may collect text information on audio data through the management of the ASR 251.

The data processing module 283 may manage a Natural Language Understanding (NLU) module in relation to function execution data extraction. The NLU module may extract natural languages from audio data and performance requested function execution information by combining the extracted natural languages. In relation to this, the data processing module 283 may check type information of a function installed on the electronic device 100 by comparing the identification information of the electronic device 100 and the type information of a pre-stored installation function for each electronic device. Alternatively, the server device 200 may request function type information from the electronic device 100 to provide it to the data processing module 283. The data processing module 283 may extract function execution information on the basis of an analysis result of natural languages included in audio data and pre-stored device specific function type information (for example, a database where at least one natural language is mapped into each function is mapped). For example, the data processing module 283 may extract function execution information corresponding to the collected audio data by checking an intent for query and specific various conditions, which are identified through an analysis of natural languages. The extracted function execution information is provided to the processing data transmission module 285.

The processing data transmission module 285 delivers audio feature data, speech recognition data, and function execution information that the data processing module 283 provides, to the electronic device 100 providing audio data. In relation to this, the processing data transmission module 285 may receive information on connection with the electronic device 100 from the audio data collection module 281. According to an embodiment of the present disclosure, the processing data transmission module 285 delivers audio feature data, speech recognition data, and function execution information to the voice command manager 290.

The voice command manager 290 includes a processing data collection module 291 and a voice command management module 293.

The processing data collection module 291 receives audio feature data, speech recognition data, and function execution information that the voice search manager 280 provides. The processing data collection module 291 may store the received audio feature data, speech recognition data, and function execution information in the server storage module 250 of FIG. 3 so that they may be identified by each electronic device 100 or each user. The processing data collection module 291 of FIG. 4 may determine a weight for the collected audio feature data, speech recognition data, and function execution information. For example, the processing data collection module 291 may determine a weight (or score) for each data on the basis of information on the number of times that specific audio data is received and a time at which specific audio data is received. According to an embodiment of the present disclosure, if audio data is received relatively frequently within a predetermined period, the processing data collection module 291 may set a relatively high weight. Additionally, the processing data collection module 291 may increase (or decrease or maintain) a predetermined weight according to the number of receptions within a predetermined period. According to an embodiment of the present disclosure, the processing data collection module 291 may set a relatively high weight of audio data that is received relatively recently based on the current. Alternatively, the processing data collection module 291 may assign a predetermined weight (for example, the size of a minus weight is increased, which is interpreted to reduce the importance as a time interval increases).

If a set weight is greater than a specific condition, the processing data collection module 291 generates a voice command 80 of audio data corresponding to a corresponding weight. The processing data collection module 291 delivers the generated voice command 80 to the voice command management module 293. According to an embodiment of the present disclosure, the processing data collection module 291 delivers weight change information to the voice command management module 293. According to an embodiment of the present disclosure, the processing data collection module 291 may generate or update a voice command 80 according to the generation and management methods of the candidate recognition model 60 and the recognition model 70 described with the electronic device 100.

The voice command management module 293 receives the generated voice command 80 from the processing data collection module 291. The voice command management module 293 may receive information on weight change from the processing data collection module 291. The voice command management module 293 manages the voice command database 253 on the basis of the received voice command 80 and weight change information. For example, the voice command management module 293 may add a newly generated voice command 80 to the voice command database 253 for each electronic device. Alternatively, if the weight of a voice command 80 relating to specific audio data is changed and becomes less than a specific condition, the voice command management module 293 may remove the voice command 80 from the voice command database 253. When a new voice command 80 is generated in relation to the specific electronic device 100, the voice command management module 293 may deliver the newly generated voice command information to the electronic device 100. Additionally, when an existing voice command 80 is removed, the voice command management module 293 may deliver information on the removal situation as voice command update information to the electronic device 100.

According to an embodiment of the present disclosure, functions of the processing data collection module 291 and the voice command management module 293 may be performed on the electronic device 100, except for a speech recognition function. For example, if a set weight (or score) is greater than a specific condition, the electronic device 100 may generate a voice command 80 of audio data corresponding to a corresponding weight. The electronic device 100 may generate or update a voice command 80 according to the generation and management methods of the candidate recognition model 60 and the recognition model 70. When receiving information on weight change, the electronic device 100 may manage the storage of a voice command 80 on the basis of the received voice command 80 and weight change information. For example, the electronic device 100 may add a newly generated voice command 80 to a database storing a voice command 80. When a voice command 80 is removed from the database, the electronic device 100 may output an alarm for this through the audio module 130 or the display module 140.

According to an embodiment of the present disclosure, the electronic device 100 may include an audio module for collecting audio data and a control module for updating a voice command 80 set to execute a specific function of the electronic device 100 through voice when specific audio data is collected, on the basis of at least one of audio feature data of the audio data, speech recognition data obtained by speech recognition of the audio data, and function execution data executed in relation to the audio data.

According to an embodiment of the present disclosure, the control module 160 may update the weight of at least one of pre-stored audio feature data, the speech recognition data, and the function execution data in correspondence to the audio data collection and may generate the voice command 80 if the weight satisfies a specific condition.

According to an embodiment of the present disclosure, if the weight satisfies the specific condition, the control module 160 may generate a candidate recognition model 60 and if the weight of the candidate recognition model 60 satisfies a specific condition in relation to the audio data, may change the candidate recognition model 60 into a recognition model 70 corresponding to the voice command 80.

According to an embodiment of the present disclosure, the control module 160 may register a new voice command 80 corresponding to the recognition model 70 changed from the candidate recognition model 60.

According to an embodiment of the present disclosure, the control module 160 may update the weight of at least one of a candidate recognition model 60 and recognition model 70 having no relation with the collected audio data and may remove at least one of a specific candidate recognition model 60 and a specific recognition model 70 in correspondence to the updated weight.

According to an embodiment of the present disclosure, the control module 160 may remove a registered voice command 80 in correspondence to the recognition model 70 removal.

According to an embodiment of the present disclosure, the control module 160 may control the display of at least one of the audio feature data 51, the speech recognition data 53, the function execution information 55, and the voice command 80.

According to an embodiment of the present disclosure, the control module 160 may control at least one of the weight update of the audio feature data 51 on the basis of the frequency of occurrence of the audio feature data, the weight update of the speech recognition data 53 on the basis of the frequency of occurrence of the speech recognition data, and the weight update of the function execution data 55 using at least one of whether to execute a specific function of the function execution data 55 and a specific function execution duration time of the function execution data 55.

According to an embodiment of the present disclosure, the control module 160 may control a communication interface 110 for transmitting the audio data to a server device 200 and receiving, from the server device 200, at last one of the audio feature data 51, the speech recognition data 53, and the function execution data 55.

According to an embodiment of the present disclosure, the control module 160 may control a communication interface 110 for receiving, from the server device 200, a voice command 80 generated based on at least one of the audio feature data 51, the speech recognition data 53, and the function execution data 55.

Figure 5:
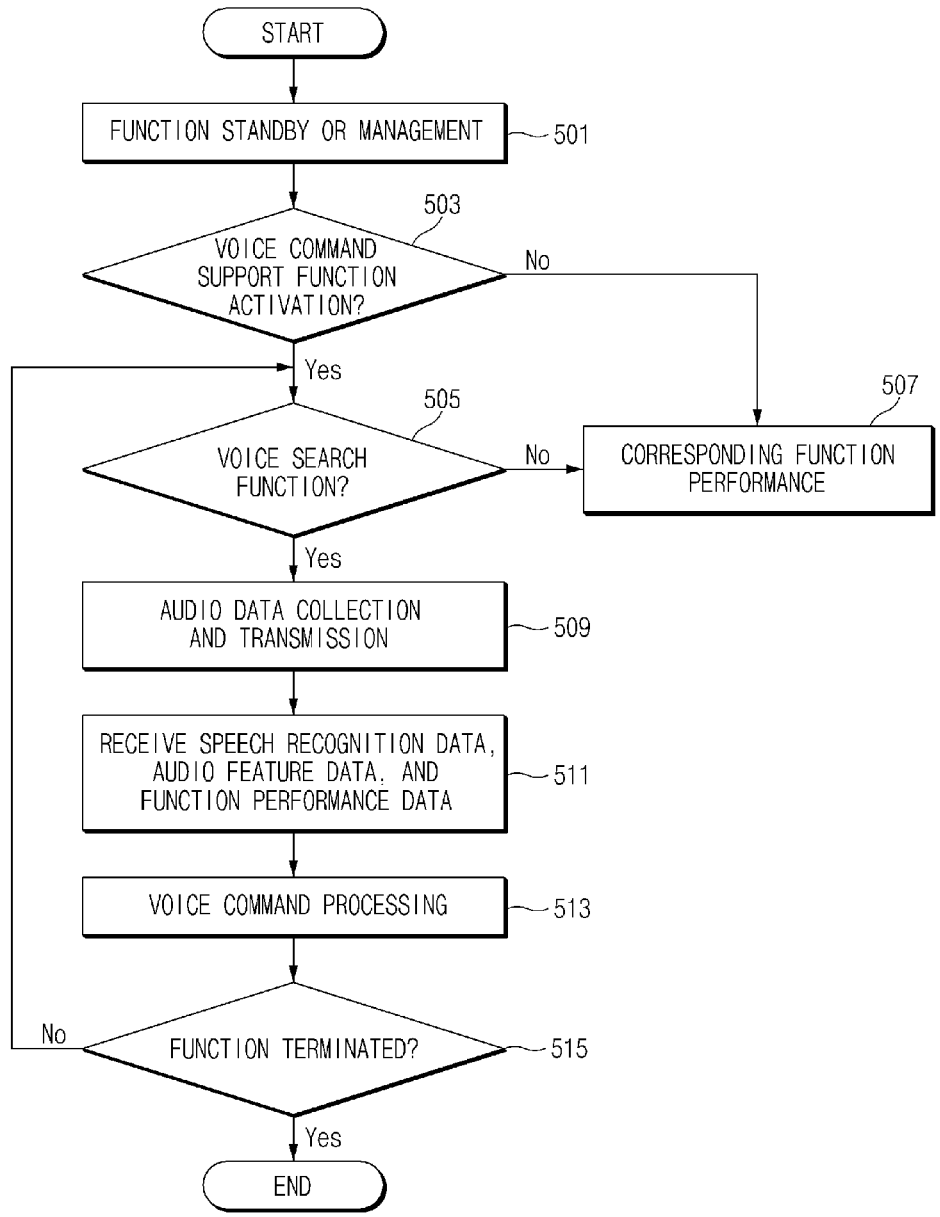
FIG. 5 is a flowchart of a voice command providing method according to an embodiment of the present disclosure.

FIG. 5 is a flowchart of a voice command providing method according to an embodiment of the present disclosure.

Referring to FIG. 5, a voice command providing method according to an embodiment of the present disclosure allows the control module 160 of the electronic device 100 to perform a management or standby function in operation 501. For example, the control module 160 may output a standby screen, a lock screen, or a specific function execution screen according to a set schedule or an input control.

In operation 503, the control module 160 checks whether there is an event occurrence relating to voice command support function activation. For example, the control module 160 may check whether there is a setting relating to a voice command support function. Alternatively, the control module 160 may check whether an input event relating to a voice command support function occurs.

If there is a voice command support function activation setting or a voice command support function activation event occurs in operation 503, the control module 160 checks whether there is an event occurrence relating to voice search function activation in operation 505. For example, the control module 160 may check the occurrence of an event for selecting a function icon relating to a voice search function and an event for requesting an app execution relating to a voice search function.

According to an embodiment of the present disclosure, when a voice search function is set to be provided by default, the control module 160 checks a corresponding setting. If there is no voice command support function activation setting or event occurrence in operation 503 or if there is no voice search function activation related setting or event occurrence in operation 505, the control module 160 controls the function execution corresponding to the occurred event type in operation 507. For example, the control module 160 may execute a specific app according to an event type or may maintain a previous state (for example, a sleep mode state, a lock screen state, a standby screen output state, etc.) of the electronic device 100.

If there is a voice search function activation related setting or event in operation 505, the control module 160 controls audio data collection and transmission in operation 509. The control module 160 may activate a microphone of the audio module 130 and collect audio data.

According to an embodiment of the present disclosure, a voice search function may be performed separately from a voice shortcut function. For example, the control module 160 may drive a specific search recognizer (for example, a search processor) in relation to voice search function execution. The control module 160 may drive a specific function performer (for example, an S-Voice processor) in relation to a voice shortcut function. Alternatively, according to an embodiment of the present disclosure, the control module 160 of the electronic device 100 may simultaneously process a voice search function and a voice shortcut function through a function performer. If audio data is collected, the control module 160 may transmit corresponding audio data to the server device 200. In relation to this, the control module 160 may establish a communication channel with the server device 200. The server device 200 may generate audio analysis data for the received audio data and transmit it to the electronic device 100.

In operation 511, the control module 160 receives audio analysis data including at least one of speech recognition data 53, audio feature data 51, and function execution data 55. In operation 513, the control module 160 may perform voice command processing on the basis of the received audio analysis data. According to an embodiment of the present disclosure, the control module 160 may update the weights of the speech recognition data 53, the audio feature data 51, and the function execution data 55, which are stored in the storage module 150, on the basis of the received audio analysis data. When audio analysis data includes analysis data for a plurality of words or word-phrases during this operation, the control module 160 may update (for example, increase a weight count) the weight of at least one of the audio feature data 51 and the speech recognition data 53 including a plurality of words or word-phrases. Alternatively, the control module 160 may update the weight of at least one of the speech recognition data 53 and audio feature data 51 corresponding to at least part of a plurality of words. Alternatively, the control module 160 may update the weight of at least one of the speech recognition data 53 and audio feature data 51 corresponding to each of a plurality of words.

According to an embodiment of the present disclosure, in the case of the audio feature data 51, the same information may have different values according to a collection environment of audio data. For example, first information (for example, audio data corresponding to "camera") collected from a noisy place and the first information collected from a less noisy place may have audio feature data of different characteristics. The control module 160 may apply an error caused by a collection environment during the update operation of the audio feature data 51. Alternatively, the control module 160 may store and manage audio data as the audio feature data 51 of a different characteristic. According to an embodiment of the present disclosure, during a speech recognition operation, the same value may be extracted based on a noise canceling operation and an estimation operation through a similarity comparison of a speech recognition database. The speech recognition data 53 may be collected as the same value with respect to the same audio data (for example, audio data corresponding to "camera").

According to an embodiment of the present disclosure, the control module 160 may update the weight of the function execution data 55 stored in the storage module 150 on the basis of function execution data 55 included in the received audio analysis data. Alternatively, the control module 160 may update (for example, assign a high weight or increase a weight as an execution duration time increases) the weight of the function execution data 55 on the basis of the execution and execution duration time of an app or corresponding function executed by function execution data 55.

If at least one of the audio feature data 51, speech recognition data 53, and function execution data 55 satisfies a specific condition (for example, a condition that it is greater than a predetermined weight set for generating a voice command 80), the control module 160 may generate and manage a voice command 80 for corresponding audio data.

According to an embodiment of the present disclosure, if the server device 200 is designed in a form of providing a voice command, the control module 160 may directly receive voice command update information from the server device 200. In this case, the control module 160 may perform the update of the voice command 80 in the storage module 150 by using the voice command update information received from the server device 200.

In operation 515, the control module 160 checks whether there is a function termination related event occurrence. If the function termination related event occurs in operation 515, the control module 160 may control at least one function termination of a voice search function and a voice command support function. If there is no function termination related event occurrence in operation 515, the control module 160 returns to operation 505 and performs the subsequent operations again. The control module 160 may support the collection of audio data that a user uses frequently, and the command processing according thereto by managing a voice search function continuously (for example, an "always on" mode).

Figure 6:
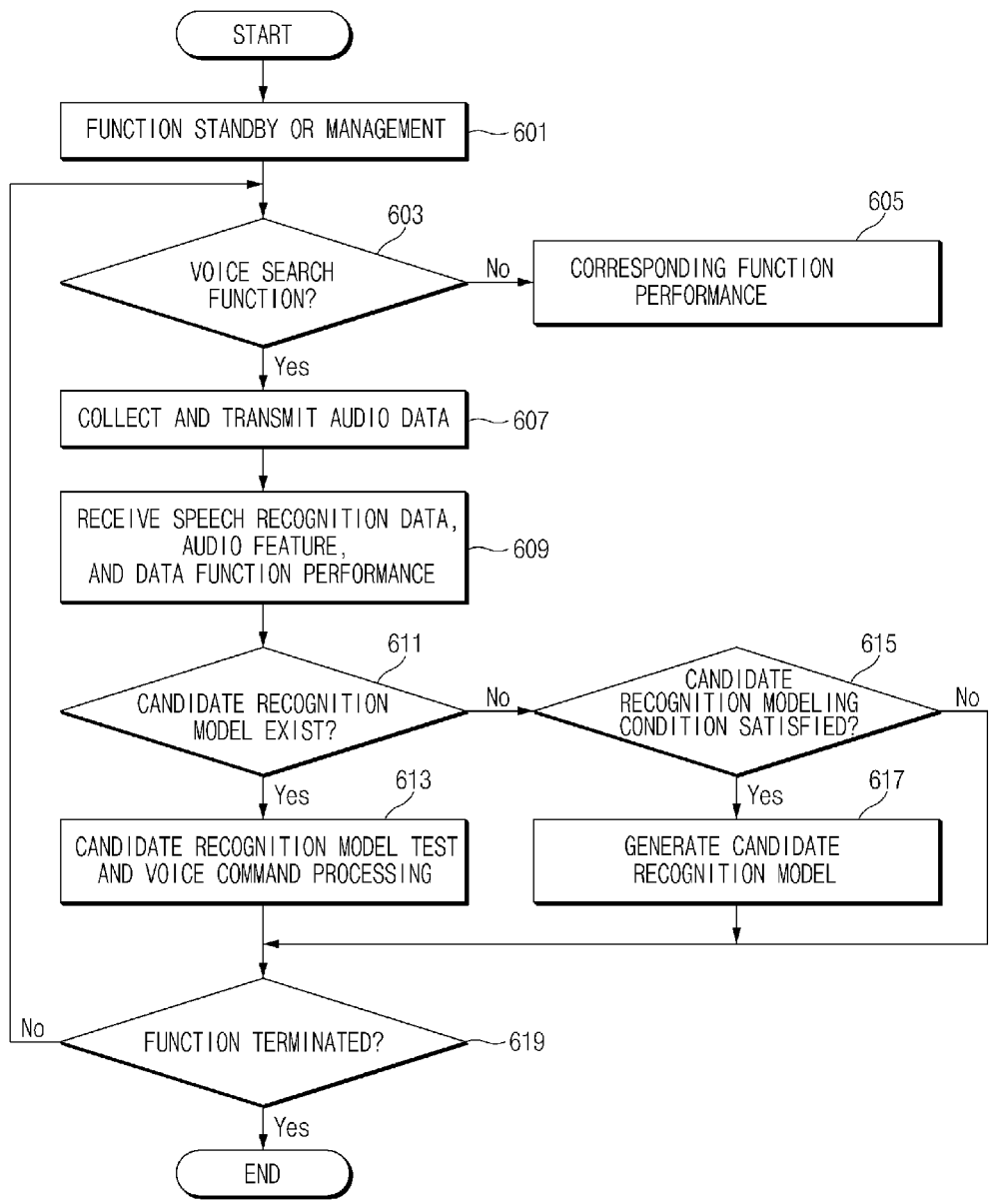
FIG. 6 is a flowchart of a voice command providing method according to an embodiment of the present disclosure.

FIG. 6 is a flowchart of a voice command providing method according to an embodiment of the present disclosure.

Referring to FIG. 6, the voice command providing method performs the management or standby function of the control module 160 in operation 601. For example, the control module 160 may perform a control to maintain the electronic device 100 in a sleep mode or output a standby screen. The control module 160 may provide a setting screen relating to voice search function activation or output a voice search function related function icon or menu to the display module 140. Alternatively, the control module 160 may allocate a function button (for example, a home key) relating to voice search function execution.

In operation 603, the control module 160 checks whether there is a voice search function activation related event occurrence or setting. If there is no voice search function activation related setting or event occurrence, the control module 160 proceeds to operation 605 and controls a function execution corresponding to an occurred event type. For example, the control module 160 may control the execution of a sound source playback function, a broadcast reception function, and so on according to the event type. Alternatively, if there is no event occurrence, the control module 160 may perform a control to maintain a function management state (for example, a sleep mode state, a specific function screen output state, and a state in which a specific function is preformed in background) of operation 601.

If an event relating to voice search function activation occurs in operation 603, the control module 160 performs audio data collection and transmission in operation 607. In operation 609, the control module 160 receives speech recognition data, audio feature data, and function execution data from the server device 200.

In operation 611, the control module 160 checks whether there is a candidate recognition model 60 relating to the received data. If there is a candidate recognition model 60 in operation 611, the control module 160 may perform candidate recognition model test and voice command processing in operation 613. For example, the control module 160 may perform the weight update of the candidate recognition model 60. Additionally, the control module 160 may perform new voice command generation according to the weight update of the candidate recognition model 60.

If there is no candidate recognition model 60 in operation 611, the control module 160 checks whether a candidate recognition modeling condition is satisfied in operation 615. For example, the control module 160 may check whether at least one of the audio feature data 51, speech recognition data 53, and function execution data 55 updated by audio analysis data satisfies a specific condition or they all satisfy a specific condition. If the candidate recognition modeling condition is satisfied in operation 615, the control module 160 performs candidate recognition model generation in operation 617. If the candidate recognition modeling condition is not satisfied in operation 615, the control module 160 skips operation 617.

In operation 619, the control module 160 checks whether there is an event occurrence relating to function termination. If the function termination related event occurs in operation 619, the control module 160 controls voice search function termination. If there is no function termination related event occurrence in operation 619, the control module 160 returns to operation 603 and performs the subsequent operations again.

Figure 7:
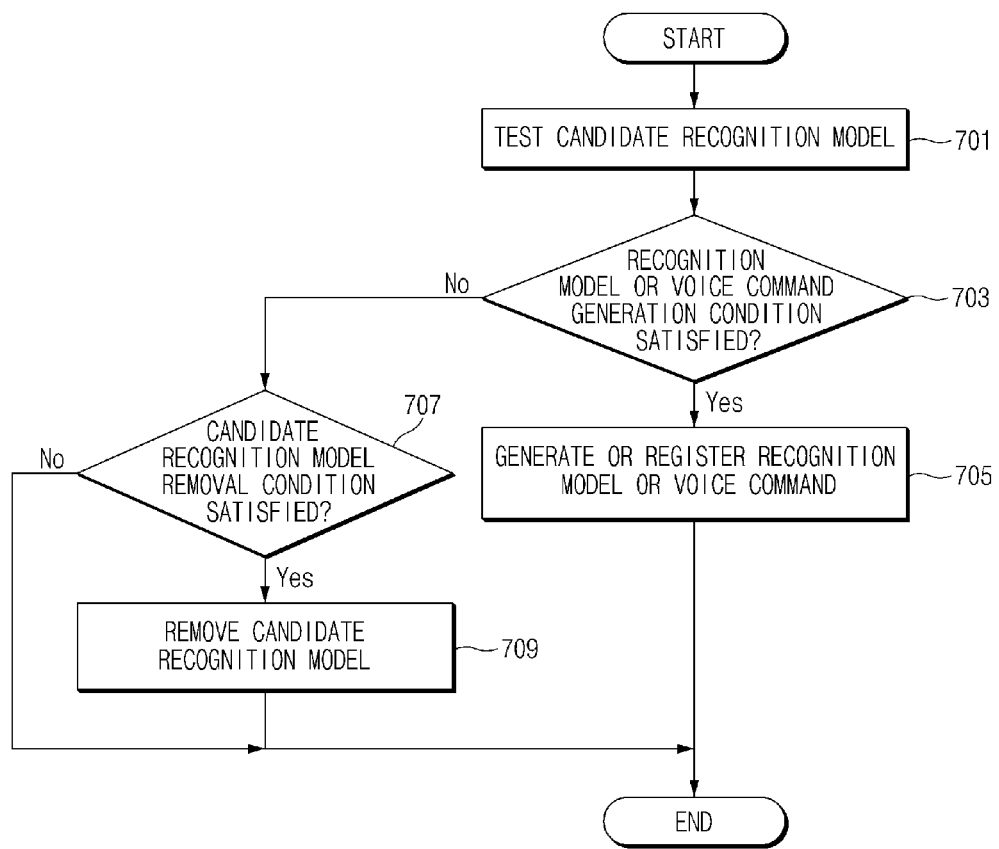
FIG. 7 is a flowchart of a voice command provision related candidate recognition model processing method according to an embodiment of the present disclosure.

FIG. 7 is a flowchart of a voice command provision related candidate recognition model processing method according to an embodiment of the present disclosure.

Referring to FIG. 7, in relation to a candidate recognition model processing method, when audio data is collected, the control module 160 performs a candidate recognition model test in operation 701. For example, the control module 160 may perform the update of the weight (or score) of audio feature data 51, speech recognition data 53, and function execution data 55 stored in the storage module 150 on the basis of the received audio analysis data. During this operation, the control module 160 may perform the weight update of at least one of the audio feature data 51, speech recognition data 53, and function execution data 55 relating to the specific candidate recognition model 60. During this operation, the control module 160 may reduce the weight of another candidate recognition model 60 in correspondence to a weight increase of the specific candidate recognition model 60.

In operation 703, the control module 160 checks whether a recognition model or voice command generation condition is satisfied. For example, when the weight of the specific candidate recognition model 60 is greater than a predetermined value, the control module 160 changes a corresponding candidate recognition model 60 into a recognition model 70. If the recognition model 70 or voice command generation condition is satisfied in operation 703, the control module 160 changes the candidate recognition model 60 into the recognition model 70 in operation 705. Additionally, the control module 160 may control the voice command generation or registration corresponding to the recognition model generation or registration. For example, the control module 160 may generate the voice command 80 on the basis of the speech recognition data 53 and function execution data 55 corresponding to the changed recognition model 70.

If the voice command generation condition is not satisfied in operation 703, the control module 160 checks whether a candidate recognition model removal condition is satisfied in operation 707. If the candidate recognition model removal condition is satisfied in operation 707, the control module 160 removes the candidate recognition model 60. If the candidate recognition model removal condition is not satisfied in operation 707, the control module 160 skips operation 709. For example, if a weight change of a candidate recognition model 60 is between a generation condition and a removal condition, the control module 160 may perform the weight update of a specific candidate recognition model 60.

According to an embodiment of the present disclosure, the control module 160 performs model removal on the recognition model 70 additionally or substitutionally in addition to the candidate recognition model 60. For example, the control module 160 removes the recognition model 70 stored in the storage module 150, for example, the recognition model 70 corresponding to a voice command generated through the candidate recognition model 60 or the recognition model 70 corresponding to a voice command generated by a user input, according to the frequency of use and the last use time.

In operation 513, the control module 160 performs voice command processing on the basis of the received audio analysis data. If there is a voice command 80, the control module 160 may update (for example, weight increase) the weight of a corresponding recognition model 70. During this operation, the control module 160 may update (for example, weight decrease) the weight of the voice command 80 having no relation to audio analysis data. If there is a recognition model 70 having a weight less than a predetermined value, the control module 160 may remove a corresponding recognition model 70. When the recognition model 70 is removed, a corresponding voice command 80 may be removed.

According to an embodiment of the present disclosure, the voice command providing method may include collecting audio data and updating a voice command 80 set to execute a specific function of an electronic device through a voice command 80 when specific audio data is collected, on the basis of at least one of audio feature data of the audio data, speech recognition data obtained by speech-recognizing the audio data, and function execution data executed in relation to the audio data.

According to an embodiment of the present disclosure, the method may include updating the weight of at least one of pre-stored audio feature data 51, the speech recognition data 53, and the function execution data 55 in correspondence to the audio data collection and generating the voice command 80 if the weight satisfies a specific condition.

According to an embodiment of the present disclosure, the updating of the voice command 80 may include generating a candidate recognition model 60 if the weight satisfies the specific condition, updating the weight of the candidate recognition model 60 in relation to the audio data, and changing the candidate recognition model 60 into a recognition model 70 corresponding to the voice command 80 if the updated weight satisfies the specific condition.

According to an embodiment of the present disclosure, the updating of the voice command 80 may include newly registering a voice command 80 corresponding to the recognition model 70 changed from the candidate recognition model 60.

According to an embodiment of the present disclosure, the updating of the voice command 80 may include updating the weight of at least one of a candidate recognition model 60 and recognition model 70 having no relation with the collected audio data and removing at least one of a specific candidate recognition model 60 and a specific recognition model 70 in correspondence to the weight update.

According to an embodiment of the present disclosure, the updating of the voice command 80 may include removing a registered voice command 80 corresponding to the recognition model 70 removal.

According to an embodiment of the present disclosure, the method may further include outputting at least one of the audio feature data 51, the speech recognition data 53, the function execution data 55, and the voice command 80.

According to an embodiment of the present disclosure, the updating of the weight may include updating the weight of the audio feature data 51 in correspondence to the frequency of occurrence of the audio feature data 51, updating the speech recognition data 53 in correspondence to the frequency of occurrence of the speech recognition data 53, and updating the weight of the function execution data 55 on the basis of whether to execute a specific function of the function execution data 55 and a specific function execution duration time of the function execution data 55.

According to an embodiment of the present disclosure, the method may further include transmitting the audio data to a server device 200 and receiving, from the server device 200, at last one of the audio feature data 51, the speech recognition data 53, and the function execution data 55.

According to an embodiment of the present disclosure, the method may further include receiving, from the server device 200, a voice command generated based on at least one of the audio feature data 51, the speech recognition data 53, and the function execution data 55.

Figure 8:
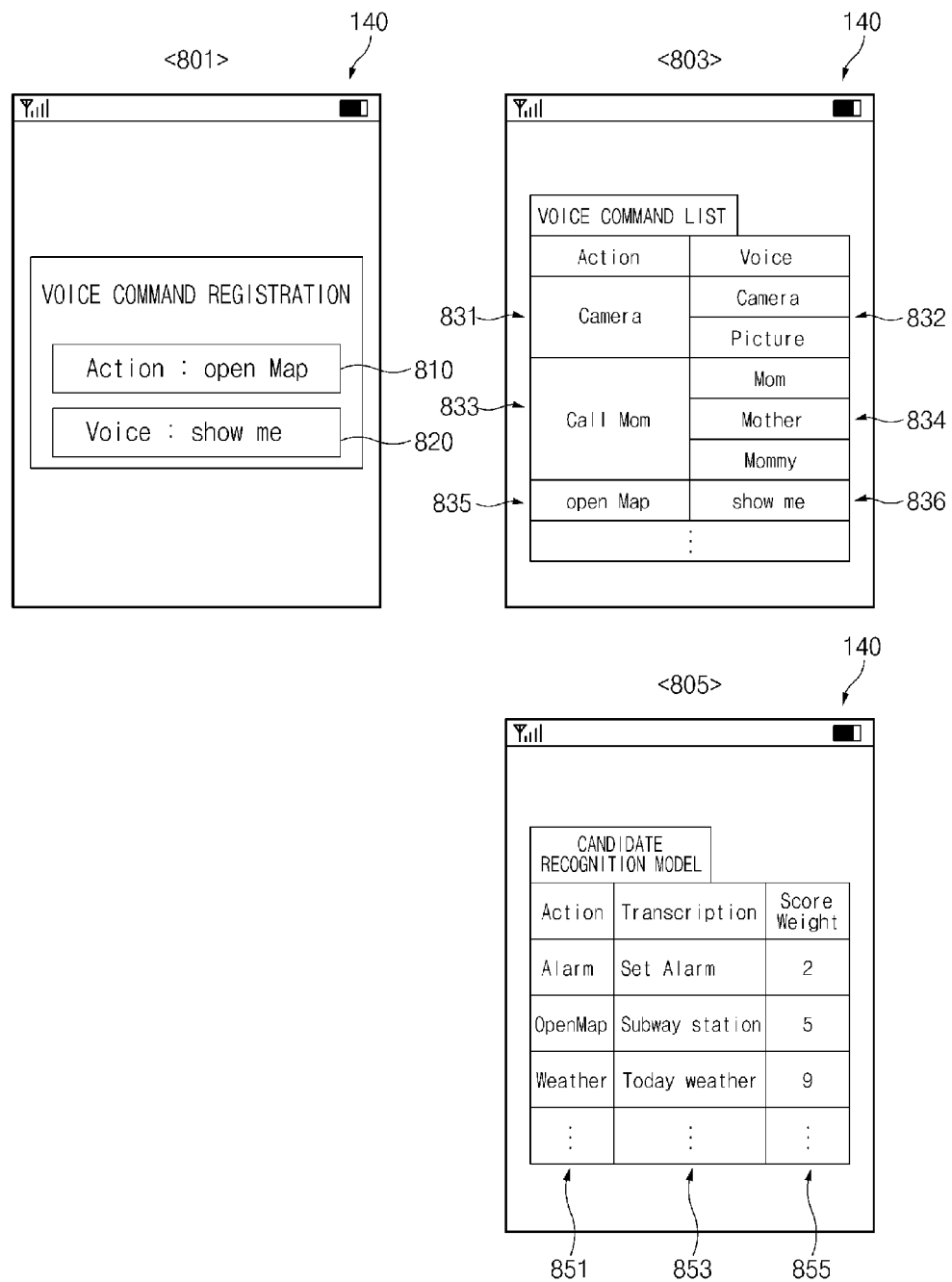
FIG. 8 is an illustration of a user interface relating to a voice command provision according to an embodiment of the present disclosure.

FIG. 8 is an illustration of a user interface relating to a voice command provision according to an embodiment of the present disclosure.

Referring to FIG. 8, the control module 160 performs registration of a new voice command corresponding to specific audio data collection. Accordingly, the display module 150 may output information for guiding voice command registration as shown in a screen 801. For example, when a user inputs the audio data "show me," the control module 160 may receive audio analysis data by transmitting corresponding audio data to the server device 200 or may collect audio analysis data by using a speech recognition algorithm and an audio analysis module. The control module 160 may update the audio feature data 51, speech recognition data 53, and function execution data 55 for the collected audio data "show me." If a voice command generation condition is satisfied during an update operation, the control module 160 may generate the audio data "show me" as a new voice command 80. The display module 140 may display the function execution information "open Map" 810 mapped into the voice command "show me" 820 together. That is, the display module 140 may perform a notification for a voice shortcut function.

According to an embodiment of the present disclosure, when a new voice command 80 is generated or an event corresponding to a voice command list view occurs, the control module 160 may perform a control to output a voice command list screen to the display module 140 as shown in a screen 803. The voice command list, for example, may include "Camera" 831, "Call Mom" 833, and "open Map" 835 corresponding to function execution data 55 "Action." A voice command "Voice" corresponding to the function execution data 55 may include "Camera" and "Picture" 832 corresponding to the "Camera" 831. Accordingly, when a user pronounces "Camera" or "Picture," the control module 160 may perform a control to execute a camera function. The voice command "Voice" may include "Mom," "Mother," and "Mommy" 834 corresponding to "Call Mom" 833. The voice command "Voice" may include "show me" 836 corresponding to "open Map" 835.

According to an embodiment of the present disclosure, if the candidate recognition model 60 is updated or an event relating to the view of the candidate recognition model 60 occurs, the control module 160 may provide a screen interface as shown in a screen 805. A candidate recognition model view screen, for example, may include a function execution data 55 "Action" 851, a speech recognition data 53 "Transcription" 853, and a weight "Score Weight" 855.

Figure 9:
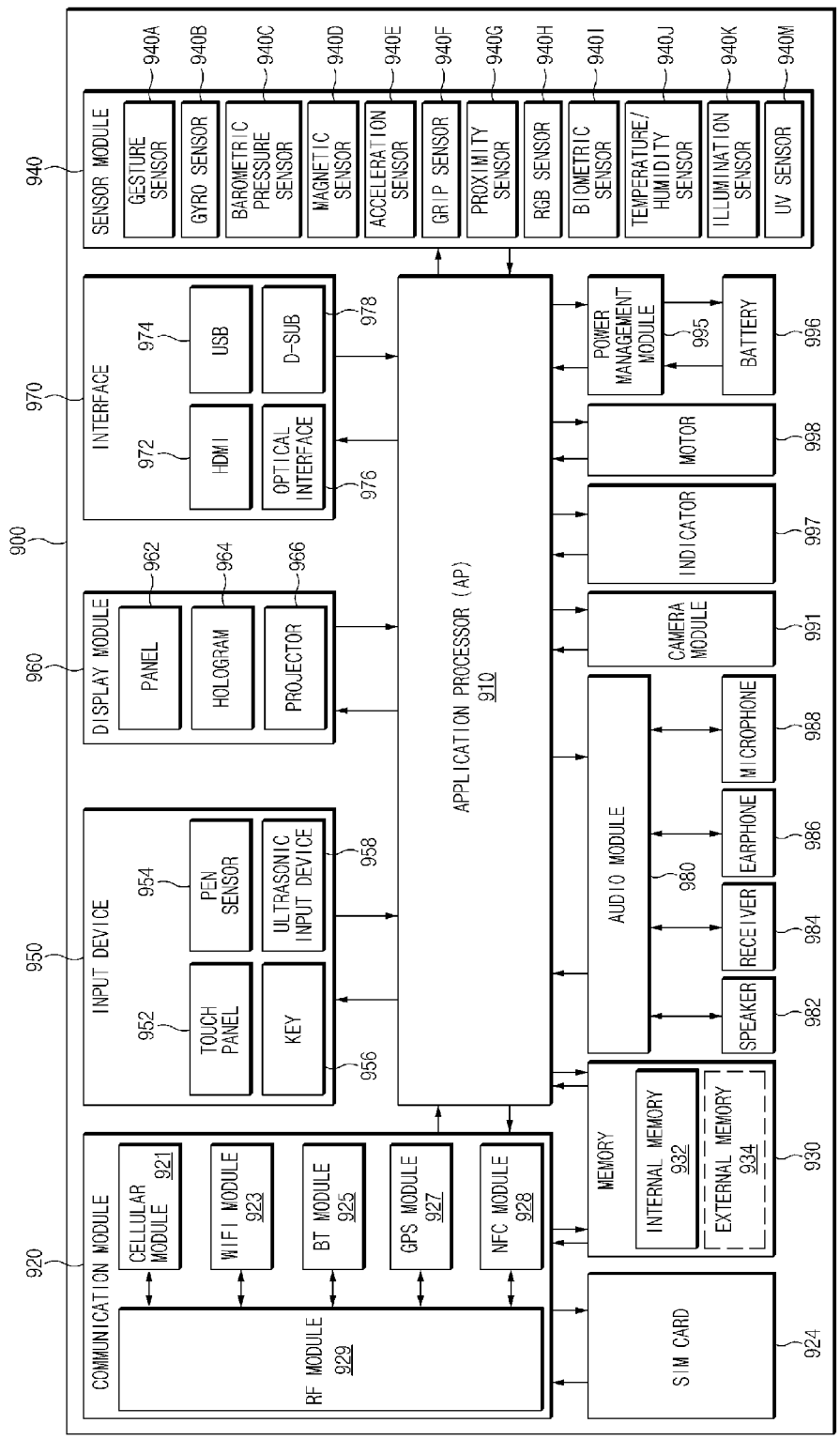
FIG. 9 is a block diagram of an electronic device according to an embodiment of the present disclosure.

FIG. 9 is a block diagram of an electronic device according to an embodiment of the present disclosure Referring to FIG. 9, the electronic device 900, for example, may configure all or part of the above-mentioned electronic device 100 shown in FIG. 1. Referring to FIG. 9, the electronic device 900 includes at least one Application Processor (AP) 910 (for example, the control module 160 of FIG. 1), a communication module 920 (for example, the communication interface 110 of FIG. 1), a Subscriber Identification Module (SIM) card 924, a memory 930 (for example, the storage module 150 of FIG. 1), a sensor module 940, an input device 950 (for example, the input module 120 of FIG. 1), a display module 960 (for example, the display module 140 of FIG. 1), an interface 970, an audio module 980 (for example, the audio module 130 of FIG. 1), a camera module 991, a power management module 995, a battery 996, an indicator 997, and a motor 998.

The AP 910 may control a plurality of hardware or software components connected to the AP 910 by executing an operating system or an application program. The AP 910 may perform various data processing and calculations with multimedia data. The AP 910 may be implemented with a System on Chip (SoC), for example. According to an embodiment of the present disclosure, the AP 910 may further include a Graphics Processing Unit (GPU).

According to an embodiment of the present disclosure, various modules relating to the above-mentioned voice command provision may be implemented in the AP 910. The AP 910 may control the collection of audio data, the transmission of audio data, the reception of audio analysis data, the update of the storage module 150 on the basis of audio analysis data, the update of the candidate recognition model 60 and the recognition model 70, and the processing and management of the voice command 80 by performing a control of related modules.

According to an embodiment of the present disclosure, various modules relating to the voice command provision may be separately disposed in at least one of a Communication Processor (CP) and an AP 910. During this operation, modules that a CP controls may be disposed to allow direct communication in the same chipset as the CP or to be connected to the CP through an external interface in terms of hardware.

According to an embodiment of the present disclosure, various modules relating to the voice command provision may be disposed in a CP. A CP may control related modules. In this case, the CP may be communicably connected to a cellular communication module and a WiFi module. In relation to this, when each of the configurations is connected via a system bus in the same chipset, when an AP is in a power saving mode, they are communicably connected to each other. When each of the configurations is configured with a different chipset, they are connected through an external interface, and communication may be possible without passing through an AP in terms of hardware.

The communication module 920 may perform data transmission/reception between the electronic device 900 (for example, the electronic device 100) and the server device 200 connected via network. According to an embodiment of the present disclosure, the communication module 920 may include a cellular module 921, a WiFi module 923, a Bluetooth (BT) module 925, a Global Positioning System (GPS) module 927, a Near Field Communication (NFC) module 928, and a Radio Frequency (RF) module 929.

The cellular module 921 may provide voice calls, video calls, text services, or Internet services through a communication network (for example, Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM)). The cellular module 921 may perform a distinction and authentication operation on an electronic device in a communication network by using a SIM card 924, for example. According to an embodiment of the present disclosure, the cellular module 921 may perform at least part of a function that the AP 910 provides. For example, the cellular module 921 may perform at least part of a multimedia control function.

According to an embodiment of the present disclosure, the cellular module 921 may further include a Communication Processor (CP). Additionally, the cellular module 921 may be implemented with SoC, for example. As shown in FIG. 9, components such as the cellular module 921 (for example, a CP), the memory 930, or the power management module 995 are separated from the AP 910, but according to an embodiment of the present disclosure, the AP 910 may be implemented to include some of the above-mentioned components (for example, the cellular module 921).

According to an embodiment of the present disclosure, the AP 910 or the cellular module 921 (for example, a CP) may load instructions or data, which are received from a nonvolatile memory or at least one of other components connected thereto, into a volatile memory and then may process them. Furthermore, the AP 910 or the cellular module 921 may store data received from or generated by at least one of other components in a nonvolatile memory.

According to an embodiment of the present disclosure, the cellular module 921 may be included in the communication interface 110 described with reference to FIG. 1. The cellular module 921 may establish a communication channel with the server device 200 during an operation for performing the voice command processing of the electronic device 100. Additionally, the cellular module 921 may transmit audio data that the electronic device 1000 collects and may receive audio analysis data. According to an embodiment of the present disclosure, the cellular module 921 may receive a voice command and voice command update information from the server device 200.

Each of the WiFi module 923, the BT module 925, the GPS module 927, and the NFC module 928 may include a processor for processing data transmitted/received through a corresponding module. The WiFi module 923 and the BT module 925 may be included in the communication interface 110. The GPS module 927 may be included in the communication interface 110.

Although the cellular module 921, the WiFi module 923, the BT module 925, the GPS module 927, and the NFC module 928 are shown as separate blocks in FIG. 9, according to an embodiment of the present disclosure, some (for example, at least two) of the cellular module 921, the WiFi module 923, the BT module 925, the GPS module 927, and the NFC module 928 may be included in one Integrated Circuit (IC) or an IC package. For example, at least some (for example, a CP corresponding to the cellular module 921 and a WiFi processor corresponding to the WiFi module 923) of the processors respectively corresponding to the cellular module 921, the WiFi module 923, the BT module 925, the GPS module 927, and the NFC module 928 may be implemented with one SoC.

According to an embodiment of the present disclosure, the WiFi module 923 may be included in the communication interface 110 described with reference to FIG. 1. The WiFi module 923 may establish a communication channel between the electronic device 100 and the server device 200. The WiFi module 923 may transmit at least one of the identification information of audio data and the electronic device 100 or the function type information of the electronic device 100 to the server device 200. The WiFi module 923 may receive at least one of audio analysis data and voice command update information from the server device 200.

The RF module 929 may be responsible for data transmission, for example, the transmission of an RF signal. The RF module 929 may include a transceiver, a Power Amplifier Module (PAM), a frequency filter, or a Low Noise Amplifier (LNA). Additionally, the RF module 929 may further include components for transmitting/receiving electromagnetic waves in free space in a wireless communication, for example, conductors or conductive wires. Although the cellular module 921, the WiFi module 923, the BT module 925, the GPS module 927, and the NFC module 928 share one RF module 929 shown in FIG. 9, according to an embodiment of the present disclosure, at least one of the cellular module 921, the WiFi module 923, the BT module 925, the GPS module 927, and the NFC module 928 may perform the transmission/reception of an RF signal through an additional RF module.

The SIM card 924 may be inserted into a slot formed at a specific position of an electronic device. The SIM card 924 may include unique identification information (for example, an Integrated Circuit Card Identifier (ICCID)) or subscriber information (for example, an International Mobile Subscriber Identity (IMSI)). According to an embodiment of the present disclosure, the SIM card 924 may be a partial configuration of the memory 930. When the SIM card 924 is inserted into a slot, the AP 910 may perform the initialization operation of the SIM card 924.

The memory 930 (for example, the storage module 150) may include an internal memory 932 or an external memory 934. The internal memory 932 may include at least one of a volatile memory (for example, Dynamic Random Access Memory (DRAM), Static RAM (SRAM), Synchronous DRAM (SDRAM)) and a nonvolatile memory (for example, One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory). According to an embodiment of the present disclosure, the internal memory 932 may be a Solid State Drive (SSD).

The external memory 934 may further include a flash drive, for example, a Compact Flash (CF) drive, a Secure Digital (SD) memory card, a Micro SD (Micro-SD) memory card, a Miniature SD (Mini-SD) memory card, an extreme Digital (xD) memory card, or a memory stick. The external memory 934 may be functionally connected to the electronic device 900 through various interfaces. According to an embodiment of the present disclosure, the electronic device 900 may further include a storage device (or a storage medium) such as a hard drive.

The sensor module 940 measures physical quantities or detects an operating state of the electronic device 900, thereby converting the measured or detected information into electrical signals. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (for example, a Red, Green, Blue (RGB) sensor), a biometric sensor 940I, a temperature/humidity sensor 940J, an illumination sensor 940K, and an Ultra Violet (UV) light sensor 940M. Additionally or alternatively, the sensor module 940 may include an Electronic nose (E-nose) sensor, an ElectroMyoGraphy (EMG) sensor, an ElectroEncephalogram (EEG) sensor, an ElectroCardioGram (ECG) sensor, an InfraRed (IR) sensor, an iris sensor, or a fingerprint sensor. The sensor module 940 may further include a control circuit for controlling at least one sensor therein.

According to an embodiment of the present disclosure, the sensor module 940 may collect operation related sensor signals of the electronic device 900. The sensor signals that the sensor module 940 collects may be delivered to the AP 910. The AP 910 may perform voice command processing on the basis of the delivered sensor signals. For example, the sensor signals delivered from the sensor module 940 may be used as a trigger signal relating to the activation of at least one of a voice command providing function and a voice search function.

At least one sensor included in the sensor module 940 may be activated in relation to the management of the electronic device 100. For example, a sensor signal of a sensor for detecting the grip of the electronic device 100 may be used as a sensor signal relating to voice search function activation. Additionally, a sensor signal of a grip detection sensor may be used as a sensor signal relating to microphone activation. The grip detection sensor may be deactivated in correspondence to a voice search function deactivation.

The input device 950 may include a touch panel 952, a (digital) pen sensor 954, a key 956, or an ultrasonic input device 958. The input device 950 may include the input module 120 of FIG. 1.

The touch panel 952 may recognize a touch input through at least one of capacitive type, resistive type, infrared type, or ultrasonic type methods, for example. Additionally, the touch panel 952 may further include a control circuit. In the case of the capacitive type method, both direct touch and proximity recognition are possible. The touch panel 952 may further include a tactile layer. In this case, the touch panel 952 may provide a tactile response to a user. According to an embodiment of the present disclosure, the touch panel 952 may generate a touch event relating to the execution of at least one of a voice command providing function and a voice search function. For example, the touch panel 952 may provide a touch event for removing at least one of a candidate recognition model 60 and a recognition model 70 and requesting to change a specific candidate recognition model 60 into a recognition model 70 in relation to a screen interface. According to an embodiment of the present disclosure, the touch panel 952 may generate a touch event for activating or deactivating a screen automatic conversion function or selecting the type of a function to be applied to a screen automatic conversion function.

The (digital) pen sensor 954 may be implemented through a method similar or identical to that of receiving a user's touch input or an additional sheet for recognition. The key 956 may include a physical button, an optical key, or a keypad, for example. At least one key, for example, a home key, in the key 956 may generate a key event relating to voice search function activation or a key event relating to voice command providing function activation. The ultrasonic input device 958, as a device checking data by detecting sound waves through a microphone (for example, a microphone 988) in the electronic device 900, may provide wireless recognition through an input tool generating ultrasonic signals. According to an embodiment of the present disclosure, the electronic device 900 may receive a user input from an external device (for example, a computer or a server) connected thereto through the communication module 920.

The display module 960 (for example, the display module 140) may include a panel 962, a hologram device 964, or a projector 966. The panel 962 may include a Liquid-Crystal Display (LCD) or an Active-Matrix Organic Light-Emitting Diode (AM-OLED). The panel 962 may be implemented to be flexible, transparent, or wearable, for example. The panel 962 and the touch panel 952 may be configured with one module. The hologram 964 may show three-dimensional images in the air by using the interference of light. The projector 966 may display an image by projecting light onto a screen. The screen, for example, may be placed internally or externally to the electronic device 900. According to an embodiment of the present disclosure, the display 960 may further include a control circuit for controlling the panel 962, the hologram device 964, or the projector 966.

The interface 970 may include a High-Definition Multimedia Interface (HDMI) 972, a Universal Serial Bus (USB) 974, an optical interface 976, or a D-subminiature (D-sub) connector 978, for example. Additionally/alternately, the interface 970 may include a Mobile High-dimension Link (M-IL) interface, a Secure Digital (SD) card/Multi-Media Card (MMC) interface, or an Infrared Data Association (IrDA) standard interface.

The audio module 980 (for example, the audio module 130 of FIG. 1) converts sound into electrical signals and vice versa. The audio module 980 may process sound information inputted/outputted through a speaker 982, a receiver 984, an earphone 986, or a microphone 988. According to an embodiment of the present disclosure, the audio module 130 disposed in the electronic device 100 may collect audio data. Additionally, the audio module 130 may output audio data relating to function execution by a voice command.

The camera module 991, as a device for capturing a still image and a video, may include at least one image sensor (for example, a front sensor or a rear sensor), a lens, an Image Signal Processor (ISP), or a flash (for example, a Light-Emitting Diode (LED) or a xenon lamp).

The power management module 995 manages the power of the electronic device 900. According to an embodiment of the present disclosure, the power management module 995 may control the power supply of at least one device element of the electronic device 100. For example, when the battery power of the electronic device 100 is less than a setting value, the power management module 995 may cut off the power supply of specific device elements (for example, a sensor module 940, a communication module 920 for establishing a direct communication channel, a GPS module 927, and so on). The power management module 995 may change the power supply of device elements activated in relation to a communication function of the electronic device 100 according to a communication connection release with the server device 200. The power management module 995 may include a Power Management IC (PMIC), a charger IC, or a battery gauge, for example.

The PMIC may be built in an IC or an SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. The wireless charging method includes, for example, a magnetic resonance method, a magnetic induction method, or an electromagnetic method. An additional circuit for wireless charging, for example, a circuit such as a coil loop, a resonant circuit, or a rectifier circuit, may be added.

The battery gauge measures the remaining battery power amount of the battery 996, or a voltage, current, or temperature of the battery 396 during charging. The battery 996 may store or generate electrical power and may supply electrical power to the electronic device 900 by using the stored or generated electrical power. The battery 996, for example, may include a rechargeable battery or a solar battery.

The indicator 997 may display a specific state of the electronic device 900 or part thereof (for example, the AP 910), for example, a booting state, a message state, or a charging state. According to an embodiment of the present disclosure, the indicator 997 may display a voice command providing function state, a voice search function execution state, and a voice command based function execution available state. The indicator 997 may display a connection state of the voice command provision based server device 200 The motor 998 may convert electrical signals into mechanical vibration. The electronic device 900 may include a processing device (for example, a GPU) for mobile TV support. A processing device for mobile TV support may process media data according to the standards such as Digital Multimedia Broadcasting (DMB), Digital Video Broadcasting (DVB), or media flow.

Each of the above-mentioned components of the electronic device according to an embodiment of the present disclosure may be configured with at least one component and the name of a corresponding component may vary according to the kind of an electronic device. An electronic device according to an embodiment of the present disclosure may include at least one of the above-mentioned components, may not include some of the above-mentioned components, or may further include another component. Additionally, some of components in an electronic device according to an embodiment of the present disclosure are configured as one entity, so that functions of previous corresponding components are performed identically.

The term "module" used in various embodiments of the present disclosure, for example, may refer to a unit including a combination of at least one of hardware, software, and firmware. The terms "module," "unit," "logic," "logical block," "component," or "circuit" may be interchangeably used. The term "module" may refer to a minimum unit or part of an integrally configured component. The term "module" may refer to a minimum unit performing at least one function or part thereof. The "module" may refer to a device implemented mechanically or electronically. For example, the term "module" according to various embodiments of the present disclosure may refer to at least one of an Application-Specific Integrated Circuit (ASIC) performing specific operations, Field-Programmable Gate Arrays (FPGAs), or a programmable-logic device, all of which are known or will be developed in the future.

According to an embodiment of the present disclosure, at least part of a device (for example, modules or functions thereof) or a method (for example, operations) according to the present disclosure, for example, as in a form of a programming module, may be implemented using an instruction stored in non-transitory computer-readable storage media. When at least one processor (for example, the processor 210) executes an instruction, it may perform a function corresponding to the instruction. The non-transitory computer-readable storage media may include the memory 930, for example. At least part of a programming module may be implemented (for example, executed) by the Application Processor 910, for example. At least part of a programming module may include a module, a program, a routine, sets of instructions, or a process to perform at least one function, for example.

The non-transitory computer-readable storage media may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and a hardware device especially configured to store and perform a program instruction (for example, a programming module) such as a Read Only Memory (ROM), a Random Access Memory (RAM), and a flash memory. Additionally, a program instruction may include high-level language code executable by a computer using an interpreter in addition to machine readable code generated by a complier. The hardware device may be configured to operate as at least one software module to perform an operation of an embodiment of the present disclosure and vice versa.

A module or a programming module according to an embodiment of the present disclosure may include at least one of the above-mentioned components, may not include some of the above-mentioned components, or may further include another component. Operations performed by a module, a programming module, or other components according to an embodiment of the present disclosure may be executed through a sequential, parallel, repetitive or heuristic method. Additionally, some operations may be executed in a different order or may be omitted, or other operations may be added.

The terms "include," "comprise," "have," "may include," "may comprise" and "may have" used herein indicate disclosed functions, operations, or the existence of elements but do not exclude other functions, operations or elements. Additionally, in an embodiment of the present disclosure, the terms "include," "comprise," "including," or "comprising," specify a property, a region, a fixed number, a operation, a process, an element and/or a component but do not exclude other properties, regions, fixed numbers, operations, processes, elements and/or components.

In an embodiment of the present disclosure, the expressions "A or B" or "at least one of A or/and B" may include all possible combinations of items listed together. For instance, the expressions "A or B" or "at least one of A and/or B" may include A, B, or both A and B.

The terms such as "1st," "2nd," "first," "second," and the like used herein may refer to modifying various different elements of various embodiments of the present disclosure, but do not limit the elements. For instance, such expressions do not limit the order and/or importance of corresponding components. The expressions may be used to distinguish one element from another element. For example, a first component may be referred to as a second component and vice versa without departing from the scope and spirit of the present disclosure.

In the disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In an embodiment of the present disclosure, terms used in the present disclosure are used to describe specific embodiments, and are not intended to limit the scope of the present disclosure. The terms of a singular form may include plural forms unless they have a clearly different meaning in the context.

Unless otherwise indicated herein, all the terms used herein, which include technical or scientific terms, may have the same meanings that are generally understood by a person skilled in the art. In general, the terms defined in the dictionary should be considered to have the same meanings as the contextual meanings of the related art, and, unless clearly defined herein, should not be understood abnormally or as having excessively formal meanings.

According to an embodiment of the present disclosure, electronic devices may include at least one of smartphones, tablet Personal Computers (PCs), mobile phones, video phones, electronic book (e-book) readers, desktop PCs, laptop PCs, netbook computers, Personal Digital Assistants (PDAs), Portable Multimedia Players (PMPs), Moving Picture Experts Group Audio Layer 3 (MP3) players, mobile medical devices, cameras, and wearable devices (for example, Head-Mounted-Devices (HMDs) such as electronic glasses, electronic apparel, electronic bracelets, electronic necklaces, electronic appcessories, electronic tattoos, and smart watches).

According to an embodiment of the present disclosure, an electronic device may be smart home appliances. The smart home appliances may include at least one of, for example, televisions, Digital Video Disk (DVD) players, audio players, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

According to an embodiment of the present disclosure, an electronic device may include at least one of various medical devices (for example, Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, vehicle head modules, industrial or household robots, financial institutions' Automatic Teller Machines (ATMs), and vendors' Point of Sale (POS) devices.

In an embodiment of the present disclosure, an electronic device may include at least one of part of furniture or buildings/structures supporting call forwarding service, electronic boards, electronic signature receiving devices, projectors, and various measuring instruments (for example, water meters, electricity meters, gas meters, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

According to an embodiment of the present disclosure, fast function processing is supported by converting audio data that a user uses frequently into a voice command.

Additionally, according to an embodiment of the present disclosure, when audio data is converted into a voice command, additional server device management is unnecessary so that a wireless data resource is not necessary.

Additionally, according to an embodiments of the present disclosure, when voice commands are updated based on an audio data management history, the management of unnecessary voice commands is reduced and voice commands for a function that a user wants to frequently use are managed efficiently.

Also, embodiments of the present disclosure disclosed in the present disclosure and the accompanying drawings are provided as examples to describe the technical content and facilitate understanding but are not intended to limit the scope of the present disclosure. Accordingly, it should be construed that besides the embodiments of the present disclosure listed herein, all modifications or modified forms derived based on the technical ideas of the present disclosure are included in the scope of the present disclosure, as defined by the appended claims and their equivalents.

What is claimed is:

1. An electronic device, comprising:
a memory which stores data; and
a control module operably connected to the memory,
wherein the control module is configured to:
collect audio data;
update a voice command that is set to execute a function through voice, wherein the updating is based on at least one of audio feature data extracted from the collected audio data, speech recognition data obtained by speech recognition of the collected audio data, or function execution data executed in relation to the collected audio data;
update a weight of at least one of the audio feature data, the speech recognition data, and the function execution data; and
if the updated weight satisfies a specific condition, perform one of:
generating a candidate recognition model with the at least one of the audio feature data, the speech recognition data, and the function execution data associated with the updated weight, and updating a weight of an existing candidate recognition model according to the at least one of the audio feature data, the speech recognition data, and the function execution data associated with the updated weight, and changing an existing candidate recognition model into a recognition model corresponding to a voice command; or updating a weight of at least one of a candidate recognition model and recognition model having no relation to the collected audio data and removing at least one of a candidate recognition model and a recognition model corresponding to the updated weight.

2. The electronic device of claim 1, wherein the control module is further configured to register a new voice command corresponding to the changed recognition model.

3. The electronic device of claim 1, wherein the control module is further configured to remove a registered voice command corresponding to the removed recognition model.

4. The electronic device of claim 1, wherein the control module is further configured to control a display to output at least one of the audio feature data, the speech recognition data, the function execution data, and the voice command.

5. The electronic device of claim 1, wherein the control module is further configured to control at least one of the weight update of the audio feature data on the basis of a frequency of occurrence of the audio feature data, the weight update of the speech recognition data on the basis of a frequency of occurrence of the speech recognition data, and the weight update of the function execution data using at least one of whether to execute a function of the function execution data and a function execution duration time of the function execution data.

6. The electronic device of claim 1, wherein the control module is further configured to control a communication interface that transmits the collected audio data to a server device and receives, from the server device, at least one of the audio feature data, the speech recognition data, and the function execution data.

7. The electronic device of claim 6, wherein the control module is further configured to control a communication interface that receives, from the server device, a voice command generated based on at least one of the audio feature data, the speech recognition data, and the function execution data.

8. A voice command providing method, comprising:
collecting, by a processor of an electronic device, audio data;
updating, by the processor, a voice command that is set to execute a function through voice, wherein the updating is based on at least one of audio feature data extracted from the collected audio data, speech recognition data obtained by speech recognition of the collected audio data, or function execution data executed in relation to the collected audio data;
updating, by the processor, a weight of at least one of the audio feature data, the speech recognition data, and the function execution data; and
if the updated weight satisfies a specific condition, performing one of:
generating, by the processor, a candidate recognition model with the at least one of the audio feature data, the speech recognition data, and the function execution data associated with the updated weight, and updating, by the processor, a weight of an existing candidate recognition model according to the at least one of the audio feature data, the speech recognition data, and the function execution data associated with the updated weight, and changing, by the processor, an existing candidate recognition model into a recognition model corresponding to a voice command; or updating a weight of at least one of a candidate recognition model and recognition model having no relation to the collected audio data and removing at least one of a candidate recognition model and a recognition model corresponding to the updated weight.

9. The method of claim 8, further comprising:
registering a new voice command corresponding to the recognition model.

10. The method of claim 8, further comprising:
updating a weight of at least one of a candidate recognition model and recognition model having no relation to the collected audio data; and
removing at least one of a candidate recognition model and a recognition model corresponding to the weight of at least one of a candidate recognition model and recognition model having no relation to the collected audio data.

11. The method of claim 10, further comprising:
removing a registered voice command corresponding to the removing of the at least one of a candidate recognition model and a recognition model corresponding to the weight of at least one of a candidate recognition model and recognition model having no relation to the collected audio data.

12. The method of claim 8, further comprising:
outputting at least one of the audio feature data, the speech recognition data, the function execution information, and the voice command.

13. The method of claim 8, further comprising:
transmitting the collected audio data to a server device; and
receiving, from the server device, at least one of the audio feature data, the speech recognition data, and the function execution data.

14. The method of claim 13, further comprising:
receiving, from the server device, a voice command generated based on at least one of the audio feature data, the speech recognition data, and the function execution data.

15. A voice command providing method, comprising:
collecting, by a processor of an electronic device, audio data;
updating, by the processor, a voice command that is set to execute a function through voice, wherein the updating is based on at least one of audio feature data extracted from the collected audio data, speech recognition data obtained by speech recognition of the collected audio data, or function execution data executed in relation to the collected audio data; and
updating, by the processor, a weight of at least one of the audio feature data, the speech recognition data, and the function execution data,
wherein updating the weight comprises at least one of:
updating, by the processor, a weight of the audio feature data on the basis of a frequency of occurrence of the audio feature data and updating, by the processor, a weight of the speech recognition data on the basis of a frequency of occurrence of the speech recognition data and updating, by the processor, a weight of the function execution data on the basis of at least one of whether to execute a function of the function execution data and a function execution duration time of the function execution data; or updating a weight of at least one of a candidate recognition model with the at least one of the audio feature data, the speech recognition data, and the function execution data associated with the updated weight and recognition model having no relation to the collected audio data and removing at least one of a candidate recognition model and a recognition model on the basis of the updated weight.

16. A chipset comprising:

a non-transitory computer-readable storage medium; and at least one processor, wherein, when executing instructions stored on the non-transitory computer-readable storage medium, the at least one processor:

collects audio data;

updates a voice command that is set to execute a function through voice, wherein the updating is based on at least one of audio feature data extracted from the collected audio data, speech recognition data obtained by speech recognition of the collected audio data, and function execution data executed in relation to the collected audio data;

updating a weight of at least one of the audio feature data, the speech recognition data, and the function execution data; and if the updated weight satisfies a specific condition, performing one of:

generating a candidate recognition model with the at least one of the audio feature data, the speech recognition data, and the function execution data associated with the updated weight, and updating a weight of an existing candidate recognition model according to the at least one of the audio feature data, the speech recognition data, and the function execution data associated with the updated weight, and changing an existing candidate recognition model into a recognition model corresponding to a voice command; or updating a weight of at least one of a candidate recognition model and recognition model having no relation to the collected audio data and removing at least one of a candidate recognition model and a recognition model corresponding to the updated weight.

* * * * *